(12) United States Patent
Li et al.

(10) Patent No.: US 11,668,451 B2
(45) Date of Patent: Jun. 6, 2023

(54) SOLID-STATE GROW-LIGHTS FOR PLANT CULTIVATION

(71) Applicant: Intematix Corporation, Fremont, CA (US)

(72) Inventors: Yi-Qun Li, Danville, CA (US); Jing Qiong Zhang, Xiamen (CN)

(73) Assignee: INTEMATIX CORPORATION, Fremont, CA (US)

( * ) Notice: Subject to any disclaimer, the term of this patent is extended or adjusted under 35 U.S.C. 154(b) by 0 days.

(21) Appl. No.: 17/665,240

(22) Filed: Feb. 4, 2022

(65) Prior Publication Data
US 2022/0260236 A1    Aug. 18, 2022

Related U.S. Application Data

(63) Continuation-in-part of application No. PCT/US2022/014641, filed on Jan. 31, 2022.

(60) Provisional application No. 63/143,765, filed on Jan. 29, 2021.

(51) Int. Cl.
*F21V 9/38* (2018.01)
*A01G 7/04* (2006.01)
*F21Y 115/10* (2016.01)

(52) U.S. Cl.
CPC ............... *F21V 9/38* (2018.02); *A01G 7/045* (2013.01); *F21Y 2115/10* (2016.08)

(58) Field of Classification Search
CPC .......... A01G 7/045; A01G 9/249; A01G 7/04; F21Y 2113/10; F21Y 2115/10; F21K 9/64; F21V 5/10; F21V 9/38
See application file for complete search history.

(56) References Cited

U.S. PATENT DOCUMENTS

2017/0363257 A1* 12/2017 Petluri ................... F21V 13/14
2018/0135830 A1*  5/2018 Cai ........................... F21V 3/08

* cited by examiner

*Primary Examiner* — William J Carter
(74) *Attorney, Agent, or Firm* — Shirley A. Recipon

(57) ABSTRACT

There is provided a light emitting device, for example a grow-light, comprising: a grow-light comprising: a broadband blue solid-state light source that generates broadband blue light with a peak emission wavelength from 420 nm to 495 nm and a full width at half maximum of at least 30 nm. It may be that the broadband blue light substantially matches at least one of: the absorption peak wavelength of chlorophyll-a; the absorption peak wavelength of chlorophyll-b; and the absorption peak wavelength of carotenoid.

20 Claims, 25 Drawing Sheets

SECTION A-A

SOLID-STATE GROW-LIGHTS FOR PLANT CULTIVATION

CROSS REFERENCE TO RELATED APPLICATIONS

This application is a Continuation-In-Part bypass application of PCT application No. PCT/US2022/014641, filed Jan. 31, 2022, which claims the benefit of priority to U.S. Provisional application No. 63/143,765, filed Jan. 29, 2021, entitled "SOLID-STATE GROW-LIGHTS FOR PLANT CULTIVATION", each of which are hereby incorporated by reference in their entirety.

FIELD OF THE INVENTION

Embodiments of the invention concern solid-state, LED-based, grow-lights (light emitting devices) for plant cultivation and in particular, although not exclusively, to solid-state light sources for grow-lights for promoting photosynthesis and plant growth.

BACKGROUND OF THE INVENTION

Factors such as temperature, humidity, wind, carbon dioxide, root-zone temperature, water, nutrients, and oxygen levels play an important role in regulating and promoting plant growth. In addition, light intensity, light spectral composition, and duration of exposure to light play a major role in the growth cycle of plants including plant growth/biomass by the process of photosynthesis, plant morphology (shape) by the process of photomorphogenesis, and flowering time by the process of photoperiodism.

Photosynthesis is the process of converting light energy into chemical energy by the absorption of light by photosynthetic pigments. Light energy is absorbed by green chlorophyll pigments inside chloroplasts concentrated in leaf cells. There are two main types of chlorophyll, named chlorophyll-a (Chl-a) and chlorophyll-b (Chl-b). Both chlorophyll-a and chlorophyll-b each have absorption peaks at wavelengths corresponding to blue and red light regions of the visible spectrum. Light energy, which can be measured by photon flux density (PFD), plays a significant role in photosynthesis and effects growth rate and biomass. As well as chlorophyll pigments plants can also contain carotenoid (Caro) pigments, for example β-carotene, which provide photoprotection and play a role in the absorption of light for photosynthesis. Caro pigments, for example β-carotene, have absorption peaks corresponding to blue and green light.

The spectral range (wavelength range) of solar radiation (sunlight) from 400 nm to 700 nm that is used in the process of photosynthesis is referred to as Photosynthetically Active Radiation (PAR). Previously, photons at shorter wavelengths are believed to be so energetic that they can damage cells and tissues, but are mostly filtered out by the ozone layer in the stratosphere. Photons at longer wavelengths were believed not to carry enough energy to allow photosynthesis to take place. However, current thinking now believes that far-red light (longer than 680 nm) plays an important role in photosynthesis through what is known as the Emerson Enhancement Effect in which there is a significant increase in photosynthesis when a plant is simultaneously exposed to light of wavelengths in both the deep red (about 680 nm) and in the far-red regions of the spectrum.

Light spectral composition can be used to regulate plant morphology through a process of photomorphogenesis which is related to the plant's response to the spectral composition of light—that is the distribution of power density with wavelength. In plants, crytochrome and phototropin photoreceptors are responsible for regulating plant development based on the photomorphogenic effects of light corresponding to UV-A, UV-B, and blue portions of the electromagnetic spectrum. Crytochromes are believed to help control seed and seedling development as well as transitioning from the vegetative to the flowering stage of development, while phototropins are believed to control directional growth towards a blue light source (phototroprism). Phytochrome photoreceptors have a strong absorption in the red region (Type I—phytochrome $P_r$) and, in the far-red region (Type II—phytochrome $P_{fr}$), are believed to be responsible for regulating seed germination (photoblasty), the synthesis of chlorophyll and the timing of flowering. Controlling the spectral composition of light—in particular the ratio of the red to blue light—used in the propagation of plants can be effective in regulating the morphology and even the color of certain genotypes of plants. In general, UV to blue light inhibits cell expansion resulting in reduced leaf expansion/stem elongation, while far-red light enhances leaf expansion/stem elongation. The photomorphogenesis response is highly dependent on plant species. For example, for leafy greens such as spinach or lettuce far red light increases leaf expansion while in most other species (e.g. tomatoes) it encourages tall stem growth. In contrast, the photosynthesis process that controls plant growth is substantially invariant of plant species.

Further, as described, control of the duration of light exposure, "photoperiod control", can be used to control the flowering times of short-day and long-day plants.

Lighting requirements for plant growth are different from those of general lighting for human sight. The human eye has three types of photoreceptors (L-cones, M-cones, S-cones) that are sensitive to red, green, and blue light, and the eyes detects the ratio of the intensity of light for each color. Accordingly, for general lighting, and to ensure accurate color vision (color rendering), it is preferred that white light has an intensity spectrum, intensity versus wavelength, that resembles sunlight as closely as possible for wavelengths of light from the blue to red colors of the visible spectrum. In contrast, plants convert light energy (Photon flux) into chemical energy and are sensitive to photon flux at different wavelengths of the spectrum.

In contrast to the human eye, plants have different light receptors and cells to sense and process light with the metric of light quantity (intensity) being photon-based, Photosynthetic Photon Flux (PPF) with units μmol/s. PPF is a measure of the Photosynthetically Active Radiation (PAR) of a light source. As described above, the ratio of the photon flux can influence various parameters of the plant such as biomass, morphology, nutrition content, taste and flowering time. Thus, by controlling the photon flux ratio, horticultural growers can selectively modify/optimize plant characteristics.

Based on the strong absorption of blue and red light by plants, LED-based grow-lights generate purple light comprising a combination of a narrowband blue LED that generates blue light with a dominant wavelength of about 450 nm and full width at half maximum (FWHM) of about 20 nm or shorter, and a red LED (or red phosphor) that generates red light with a dominant wavelength of about 660 nm. Work by McCree (McCree K. J., 1972. The action spectrum, absorptance and quantum yield of photosynthesis in crop plants. Agric. Meteorol., 9: 191-216) suggest that the green to yellow part of the visible spectrum may also play a role in photosynthesis rate. As a result, there is growing interest in white LED-based grow-lights. Typically, white grow-lights comprise a plurality of warm white and cool white LEDs together with a deep red LED.

The present invention concerns improvements relating to solid-state, LED-based, light emitting devices for grow-lights and in particular, although not exclusively, to improving solid-state light sources that generate light in the blue to cyan region of the spectrum for regulating and/or promoting photosynthesis and plant growth.

SUMMARY OF THE INVENTION

Embodiments of the invention concern light emitting devices (grow-lights) comprising solid-state light sources (LEDs) whose emission spectrum in the blue to cyan region of the spectrum (about 400 nm to 520 nm) is configured to promote photosynthesis and plant growth. As described below, both the relative photosynthetic response curves, PAS (Photosynthesis Action Spectrum) and McCree Curve, indicate that plant growth efficiency is not just photon intensity dependent but also wavelength dependent in the blue to cyan region from 400 nm to 520 nm where plant absorption efficiency is greatest.

In accordance with the invention, the spectrum of light generated by the solid-state source may comprise one or more blue light emissions with peak emission wavelengths (from 420 nm to 495 nm) corresponding with the peak absorption wavelengths of chlorophyll and/or carotenoid pigments to promote photosynthesis and plant growth. Since the chlorophyll-a pigment is believed to play the most significant role in plant photosynthesis, the spectral composition of light generated by the solid-state light source may include at least a blue light emission with a peak emission that substantially matches the peak absorption wavelength (about 430 nm) of chlorophyll-a.

According to an aspect of the invention the solid-state light source can generate a narrowband blue light emission (FWHM less than 25 nm). It is believed that a narrowband emission can maximize photosynthetic energy absorption and photosynthetic efficiency. The narrowband solid-state light source can comprise a narrowband LED.

Studies indicate that while maximum photon absorption occurs at the absorption peak wavelength of the pigment, maximum photosynthesis rate can occur at wavelengths away from the absorption peak wavelength. According to another aspect of the invention the solid-state light source can generate a broadband blue light emission (FWHM from 30 nm to 80 nm) which can increase photosynthesis rate.

In this patent specification, broadband blue light refers to blue light with a FWHM (Full Width at Half Maximum) of at least 30 nm, preferably from about 40 nm to 80 nm. Broadband can also be used to denote blue to cyan light that is composed of a combination of at least two different wavelength blue to cyan light emissions. Broadband blue to cyan light can be generated using a combination of narrowband blue to cyan light emissions of two or more different wavelengths. The different wavelength narrowband blue to cyan light emissions can be generated in two ways: (i) using multiple individual blue to cyan narrowband LEDs of different peak emission wavelengths or (ii) a single broadband LED that generates multiple blue to cyan narrowband emissions using, for example, specially designed multiple different quantum wells in its active region. Thus, a broadband blue to cyan solid-state light source can be constituted by one or more narrowband solid-state light sources; such as for example, LEDs or laser diodes, each of which "directly" generates narrowband blue to cyan light of different peak emission wavelengths from 400 nm to 530 nm. Alternatively, a broadband blue to cyan solid-state light source also encompasses a broadband blue solid-state light source; for example, a broadband blue LED such as an InGaN/GaN blue to cyan LED having an active region that directly generates blue to cyan light emissions of multiple different wavelengths using different quantum wells in a multiple-quantum-well (MQW) structure. Broadband solid-state light sources of the invention are to be contrasted with Photoluminescence Converted (PC) LEDs that utilize UV solid-state light sources (UV LEDs) and generate blue light indirectly through a process of photoluminescence wavelength conversion of UV light using a blue to cyan light emitting photoluminescence material (phosphor). In other words, broadband blue to cyan solid-state light sources in accordance with the invention do not utilize/include a photoluminescence material to generate blue to cyan light.

According to a further aspect of the invention, the solid-state light source can generate full spectrum blue light whose spectral composition at wavelengths in the blue to cyan region of the spectrum, more specifically for wavelengths from 400 nm to 520 nm of the Photosynthetically Active Radiation (PAR), has an emission maxima whose intensity is substantially constant (varies less than about 25%) over the blue to cyan region of the spectrum. Full spectrum blue light can have a spectral composition that more closely matches (resembles) sunlight/daylight at wavelengths in the blue to cyan region of the spectrum. Full spectrum blue light can have a spectral composition that substantially matches (resembles) the PAS or McCree relative photosynthetic response curves. Full Spectrum Blue solid-state light sources may comprise multiple, two or more, broadband solid-state light sources.

The solid-state light sources in accordance with various aspects of the invention can be used together with red light emitting LEDs or red phosphors that generate red light emissions with peak emission wavelengths corresponding to the absorption peaks of Chlorophyll pigments in the red region of the absorption spectrum. The red light emitting diode(s) may comprise Phosphor Converted Red LED (PC Red LED) that comprises a narrowband blue LED and red photoluminescence material. The light emitting device may further comprise a red LED or a red photoluminescence material that generates far red light emission from 680 nm to 780 nm. This can increase photosynthesis when used in combination with red light in the Photosynthetically Active Radiation (PAR)—400 nm to 700 nm through the Emerson Enhancement Effect. The solid-state light source can also be used with broadband yellow to green emission phosphors for generating a broadband white spectrum in horticultural applications.

As described herein, while the wavelength in the blue to cyan region of the spectrum is important for plant photosynthesis and propagation, the relative photon count (photon flux) of photons in the blue and red regions of the spectrum is another important factor.

In arrangements, the Blue photon count can be substantially equal to the Red photon count. The inventors have determined that a grow-light having a spectrum comprising a substantially equal photon count of Blue photons and Red photons can promote photosynthesis.

In other arrangements, the Blue photon count can be greater than the Red photon count. The inventors have determined that a grow-light having a spectrum comprising a greater blue photon count than Red photon count can promote propagation.

In yet further arrangements, the Red photon count can be greater than Blue photon count. The inventors have determined that a grow-light having a spectrum comprising a greater red photon count than Blue photon count can promote flowering.

According to an aspect of the invention, there is provided a light emitting device, for instance a grow-light, comprising: a broadband blue solid-state light source that generates broadband blue light with a peak emission wavelength from 420 nm to 495 nm and a full width at half maximum of at least 30 nm. It may be that the broadband blue light substantially matches at least one of: the absorption peak wavelength of chlorophyll-a; the absorption peak wavelength of chlorophyll-b; and the absorption peak wavelength of carotenoid.

It may be that the broadband blue solid-state light source generates broadband with a peak emission wavelength of at least one of: from 420 nm to 450 nm; from 460 nm to 480 nm; and from 450 nm to 465 nm and 480 nm to 495 nm.

It may be that broadband light emission with a peak emission wavelength from 420 nm to 450 nm substantially matches the absorption peak wavelength of chlorophyll-a. It may be that broadband light emission with a peak emission wavelength from 460 nm to 480 nm substantially matches the absorption peak wavelength of chlorophyll b. It may be that broadband light emission with a peak emission wavelength from 450 nm to 465 nm and 480 nm to 495 nm substantially matches the absorption peak wavelengths of carotenoid.

The light emitting device, for instance the grow-light, may further comprise a red solid-state light source or red photoluminescence material that generates red light with a peak emission wavelength from 630 nm to 680 nm.

It may be that the broadband blue light has a blue photon flux, and the red light has a red photon flux, and wherein a ratio of the blue photon flux to the red photon flux is from about 1:3 to about 3:1.

It may be that the ratio of the blue photon flux to the red photon flux is about 1:1. It will be understood that "about" in the sense of said 1:1 ratio may correspond to approximately ±0.3. Hence, it will be understood that the ratio of about 1:1 encompasses ratios from 0.7:1 to 1.3:1. The inventors have determined that a grow-light having a spectrum comprising a substantially equal photon count of Blue photons and Red photons can promote photosynthesis.

It may be that the ratio of the blue photon flux to the red photon flux is about 3:1. It will be understood that "about" in the sense of said 3:1 ratio may correspond to approximately ±0.5. Hence, it will be understood that the ratio of about 3:1 encompasses ratios from 2.5:1 to 3.5:1. The inventors have determined that a grow-light having a spectrum comprising a greater blue photon count than Red photon count can promote propagation.

It may be that the ratio of the blue photon flux to the red photon flux is about 1:3. It will be understood that "about" in the sense of said 1:3 ratio may correspond to approximately ±0.5. Hence, it will be understood that the ratio of about 1:3 encompasses ratios from 1:2.5 to 1:3.5. The inventors have determined that a grow-light having a spectrum comprising a greater red photon count than Blue photon count can promote flowering.

It may be that the broadband blue light emission has a FWHM of one of: at least 40 nm; at least 50 nm; at least 60 nm; and from 40 nm to 80 nm.

It may be that the broadband blue solid-state light source generates a first broadband blue light from 420 nm to 450 nm with a first blue photon flux, and a second broadband blue light from 460 nm to 470 nm with a second blue photon flux, and wherein a ratio of the first blue photon flux to the second blue photon flux is from 2:1 to 4:1. In such an arrangement, it will be understood that about 67% to 80% (about 75%) of the blue photon flux corresponds to the chlorophyll-a absorption peak and about 33% to 20% (about 25%) of the blue photon flux corresponds to the chlorophyll-b absorption peak.

The light emitting device, for instance the grow-light, may further comprise an orange to red LED or orange to red photoluminescence material that generates an orange to red light emission with a peak emission wavelength from 630 nm to 680 nm.

The light emitting device, for instance the grow-light, may further comprise a far red solid-state light source or a far red photoluminescence material that generates far red light with a peak emission wavelength from about 630 nm to about 780 nm. Such wavelengths of light can increase photosynthesis through the Emerson Enhancement Effect.

It may be that the broadband blue solid-state light source comprises a plurality of narrowband blue LEDs for generating a plurality of different wavelength narrowband blue light emissions.

The broadband blue solid-state light source may comprise a broadband LED having multiple different wavelength quantum wells that generate multiple different wavelength narrowband blue light emissions.

Where the light emitting device is configured to generate white light, the light emitting device, for instance the grow-light, may further comprise a green to yellow photoluminescence material that generates green to yellow light with a peak emission wavelength from about 540 nm to about 600 nm or a cyan to red photoluminescence material that generates cyan to red light with a peak emission wavelength from about 500 nm to about 680 nm.

It may be that the broadband blue solid-state light source generates full spectrum blue light from 400 nm to 520 nm with a spectrum whose emission intensity varies by less than 25% over a wavelength range of at least 40 nm.

It may be that the emission intensity varies by less than 20%, less than 15%, or less than 10% over a wavelength range of at least 40 nm or less than 10% from 430 nm to 470 nm or from 450 nm to 465 nm.

According to another aspect, the invention comprehends a light emitting device, for instance a grow-light, comprising: a blue solid-state light source that generates blue light with a blue photon flux; and a red solid-state light source that generates red light with a red photon flux; wherein a ratio of the blue photon flux to red photon flux is from about 1:3 to about 3:1.

It may be that the ratio of the blue photon flux to the red photon flux is about 1:1. It will be understood that "about" in the sense of said 1:1 ratio may correspond to approximately ±0.3. Hence, it will be understood that the ratio of about 1:1 encompasses ratios from 0.7:1 to 1.3:1. The inventors have determined that a grow-light having a spectrum comprising a substantially equal photon count of Blue photons and Red photons can promote photosynthesis.

It may be that the ratio of the blue photon flux to the red photon flux is about 3:1. It will be understood that "about" in the sense of said 3:1 ratio may correspond to approximately ±0.5. Hence, it will be understood that the ratio of about 3:1 encompasses ratios from 2.5:1 to 3.5:1. The inventors have determined that a grow-light having a spectrum comprising a greater blue photon count than Red photon count can promote propagation.

It may be that the ratio of the blue photon flux to the red photon flux is about 1:3. It will be understood that "about" in the sense of said 1:3 ratio may correspond to approximately ±0.5. Hence, it will be understood that the ratio of about 1:3 encompasses ratios from 1:2.5 to 1:3.5. The inventors have determined that a grow-light having a spectrum comprising a greater red photon count than Blue photon count can promote flowering.

It may be that the blue solid-state light source comprises a broadband blue solid-state light source that generates broadband blue light with a peak emission wavelength from 420 nm to 495 nm and a full width at half maximum of at least 30 nm.

The broadband blue solid-state light source may generate broadband with a peak emission wavelength of at least one of: from 420 nm to 450 nm; from 460 nm to 480 nm; and from 450 nm to 465 nm and 480 nm to 495 nm.

It may be that the broadband blue light substantially matches at least one of: the absorption peak wavelength of chlorophyll-a; the absorption peak wavelength of chlorophyll-b; and the absorption peak wavelength of carotenoid.

It may be that the blue solid state light source generates a first broadband blue light from 420 nm to 450 nm with a first blue photon flux, and a second broadband blue light from 460 nm to 470 nm with a second blue photon flux, and wherein a ratio of the first blue photon flux to the second blue photon flux is from 2:1 to 4:1. In such an arrangement, it will be understood that about 67% to 80% (about 75%) of the blue photon flux corresponds to the chlorophyll-a absorption peak and about 33% to 20% (about 25%) of the blue photon flux corresponds to the chlorophyll-b absorption peak.

The red solid-state light source may comprise a narrowband blue LED and a red photoluminescence material.

The light emitting device, for instance the grow-light, may further comprise a far red solid-state light source or a far red photoluminescence material that generates far red light with a peak emission wavelength from about 680 nm to about 780 nm.

According to another aspect, there is contemplated a grow-light comprising: a narrowband blue solid-state light source that generates narrowband blue light with a full width at half maximum from about 10 nm to 30 nm and a peak emission wavelength of at least one of: from 425 nm to 435; from 460 nm to 470 nm; and from 450 nm to 465 nm and 480 nm to 495 nm.

The narrowband blue light may substantially match at least one of: the absorption peak wavelength of chlorophyll-a; the absorption peak wavelength of chlorophyll-b; and the absorption peak wavelength of carotenoid.

It may be that the narrowband blue light source generates a first narrowband blue light from 420 nm to 450 nm with a first blue photon flux, and a second narrowband blue light from 460 nm to 470 nm with a second blue photon flux, and wherein a ratio of the first blue photon flux to the second blue photon flux is about 3:1, that is from 2:1 to 4:1. In such an arrangement, it will be understood that about 67% to 80% (about 75%) of the blue photon flux corresponds to the chlorophyll-a absorption peak and about 33% to 20% (about 25%) of the blue photon flux corresponds to the chlorophyll-b absorption peak.

The light emitting device, for instance the grow-light, may further comprise a red solid-state light source or red photoluminescence material that generates red light with a peak emission wavelength from 630 nm to 680 nm.

It may be that the narrowband blue light has a blue photon flux, and the red light has a red photon flux, and wherein a ratio of the blue photon flux to the red photon flux is from about 1:3 to about 3:1.

It may be that the ratio of the blue photon flux to the red photon flux is about 1:1. It will be understood that "about" in the sense of said 1:1 ratio may correspond to approximately ±0.3. Hence, it will be understood that the ratio of about 1:1 encompasses ratios from 0.7:1 to 1.3:1. The inventors have determined that a grow-light having a spectrum comprising a substantially equal photon count of Blue photons and Red photons can promote photosynthesis.

It may be that the ratio of the blue photon flux to the red photon flux is about 3:1. It will be understood that "about" in the sense of said 3:1 ratio may correspond to approximately ±0.5. Hence, it will be understood that the ratio of about 3:1 encompasses ratios from 2.5:1 to 3.5:1. The inventors have determined that a grow-light having a spectrum comprising a greater blue photon count than Red photon count can promote propagation.

It may be that the ratio of the blue photon flux to the red photon flux is about 1:3. It will be understood that "about" in the sense of said 1:3 ratio may correspond to approximately ±0.5. Hence, it will be understood that the ratio of about 1:3 encompasses ratios from 1:2.5 to 1:3.5. The inventors have determined that a grow-light having a spectrum comprising a greater red photon count than Blue photon count can promote flowering.

The light emitting device, for instance the grow-light, may further comprise a far red solid-state light source or a far red photoluminescence material that generates far red light with a peak emission wavelength from about 680 nm to about 780 nm. Such wavelengths of light can increase photosynthesis through the Emerson Enhancement Effect.

The light emitting device, for instance the grow-light, may further comprise a green to yellow photoluminescence material that generates green to yellow light with a peak emission wavelength from about 540 nm to about 600 nm.

The light emitting device, for instance the grow-light, may further comprise a cyan to red photoluminescence material that generates cyan to red light with a peak emission wavelength from about 500 nm to about 660 nm.

According to another aspect of the invention, there is envisaged a grow-light comprising: a broadband full spectrum blue solid-state light source that generates a full spectrum blue light from 400 nm to 520 nm with a spectrum whose emission intensity varies by less than 25% over a wavelength range of at least 40 nm.

The emission intensity may vary by less than 20%, less than 15%, or less than 10% over a wavelength range of at least 40 nm.

It may be that the emission intensity varies by less than 10% from 430 nm to 470 nm or from 450 nm to 465 nm.

It may be that the broadband full spectrum blue solid-state light source comprises a plurality of broadband blue LEDs that each generate a broadband blue emission with a peak emission wavelength from 400 nm to 520 nm.

The light emitting device, for instance the grow-light, may further comprise a red solid-state light source or red photoluminescence material that generates red light with a peak emission wavelength from 630 nm to 700 nm.

It may be that the full spectrum blue light has a blue photon flux, and the red light has a red photon flux, and wherein a ratio of the blue photon flux to the red photon flux is from about 1:3 to about 3:1.

It may be that the ratio of the blue photon flux to the red photon flux is about 1:1. It will be understood that "about"

in the sense of said 1:1 ratio may correspond to approximately ±0.3. Hence, it will be understood that the ratio of about 1:1 encompasses ratios from 0.7:1 to 1.3:1. The inventors have determined that a grow-light having a spectrum comprising a substantially equal photon count of Blue photons and Red photons can promote photosynthesis.

It may be that the ratio of the blue photon flux to the red photon flux is about 3:1. It will be understood that "about" in the sense of said 3:1 ratio may correspond to approximately ±0.5. Hence, it will be understood that the ratio of about 3:1 encompasses ratios from 2.5:1 to 3.5:1. The inventors have determined that a grow-light having a spectrum comprising a greater blue photon count than Red photon count can promote propagation.

It may be that the ratio of the blue photon flux to the red photon flux is about 1:3. It will be understood that "about" in the sense of said 1:3 ratio may correspond to approximately ±0.5. Hence, it will be understood that the ratio of about 1:3 encompasses ratios from 1:2.5 to 1:3.5. The inventors have determined that a grow-light having a spectrum comprising a greater red photon count than Blue photon count can promote flowering.

The light emitting device, for instance the grow-light, may further comprise a far red solid-state light source or a far red photoluminescence material that generates far red light with a peak emission wavelength from about 680 nm to about 780 nm. Such wavelengths of light can increase photosynthesis through the Emerson Enhancement Effect.

The light emitting device, for instance the grow-light, may further comprise a green to yellow photoluminescence material that generates green to yellow light with a peak emission wavelength from about 540 nm to about 600 nm.

The light emitting device, for instance the grow-light, may further comprise a cyan to red photoluminescence material that generates cyan to red light with a peak emission wavelength from about 500 nm to about 660 nm.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, in which:

FIGS. 2A and 2B are schematic views of a packaged light emitting device in accordance with the invention in which FIG. 2A is a plan view of the device and FIG. 2B is a sectional side view through A-A;

DETAILED DESCRIPTION OF THE INVENTION

Figure 1A:
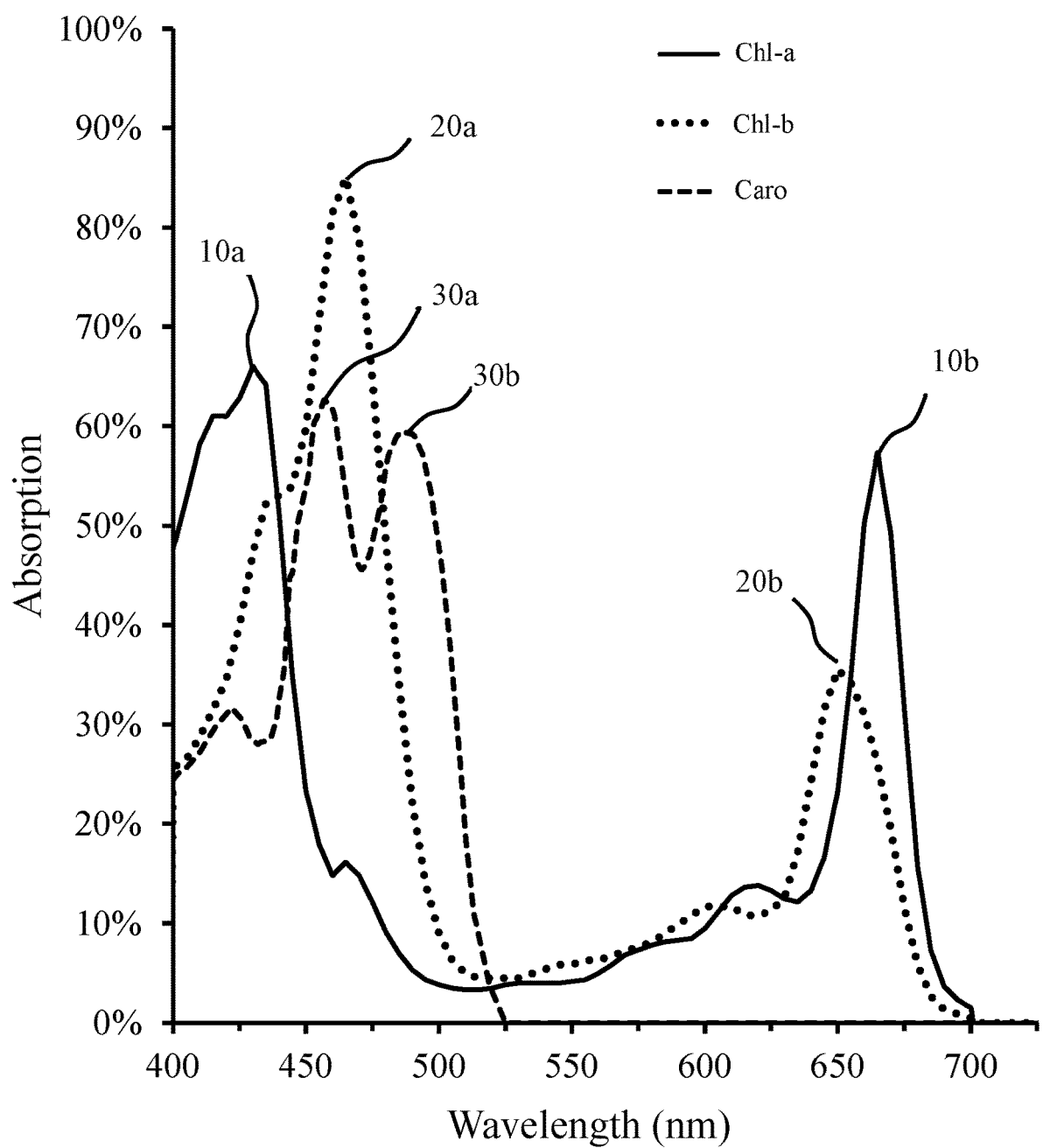
FIG. 1A shows absorption spectra, absorption (%) versus wavelength (nm), for photosynthetic pigments: (i) chlorophyll-a (solid line—Chl-a), (ii) chlorophyll-b (dotted line—Chl-b), and (iii) carotenoid (dashed line—Caro)

Embodiments of the present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

As described herein embodiments of the invention concern grow-lights (light emitting devices) comprising solid-state light sources (LEDs) that generate blue light with peak emission wavelengths corresponding with the peak absorption wavelengths of chlorophyll and/or carotenoid pigments to promote photosynthesis and plant growth. The solid-state light sources can be narrowband, broadband or full spectrum. In this patent specification, narrowband blue light refers to light with a FWHM less than 25 nm, broadband blue light refers to light with a FWHM from 30 nm to 80 nm, and full spectrum blue light refers to light with a substantially constant intensity (i.e. an intensity variation of less than 25%) over a 40 nm wavelength range.

Purple light emitting grow-lights may comprise solid-state light sources of the invention used together with red light emitting LEDs or red phosphors that generate red light emissions with peak emission wavelengths corresponding to the absorption peaks of Chlorophyll pigments in the red region of the spectrum. The light emitting device may further comprise a red LED or a red photoluminescence material that generates far red light emission. This can increase photosynthesis when used in combination with red light in the Photosynthetically Active Radiation (PAR), 400 nm to 700 nm, through the Emerson Enhancement Effect.

White light emitting grow-lights may further comprise broadband yellow to green emission photoluminescence materials (phosphors) for generating white light. Such light can be beneficial in promoting plant growth and aiding visual inspection of plant growth.

In this specification Dev.# is used to denote both grow-lights (light emitting devices) and solid-state light sources in accordance with embodiments of the invention.

FIG. 1A shows absorption spectra, absorption (%) versus wavelength (nm), for photosynthetic pigments: (i) chlorophyll-a (solid line—Chl-a), (ii) chlorophyll-b (dotted line—Chl-b), and (iii) carotenoid (dashed line—Caro).

As indicated in FIG. 1A, chlorophyll-a (Chl-a) has: (i) an absorption peak 10a with a peak absorption of about 66% (0.66) at a peak absorption wavelength of about 430 nm in the blue light region of the spectrum and (ii) a second absorption peak 10b of about 58% (0.58) at a peak absorption wavelength of about 665 nm in the red light region of the spectrum. Chlorophyll-b (Chl-b) has: (i) an absorption peak 20a with a peak absorption of about 85% (0.85) at a peak absorption wavelength of about 465 nm in the blue light region of the spectrum and (ii) a second absorption peak 20b of about 35% (0.35) at a peak absorption wavelength of about 650 nm in the red light region of the spectrum. Carotenoid (Caro) has: an absorption peak 30a with a peak absorption of about 62% (0.62) at a peak absorption wavelength of about 457 nm in the blue light region of the spectrum and (ii) a second absorption peak 30b with a peak absorption wavelength of about 486 nm in the blue light region of the spectrum.

Figure 1B:
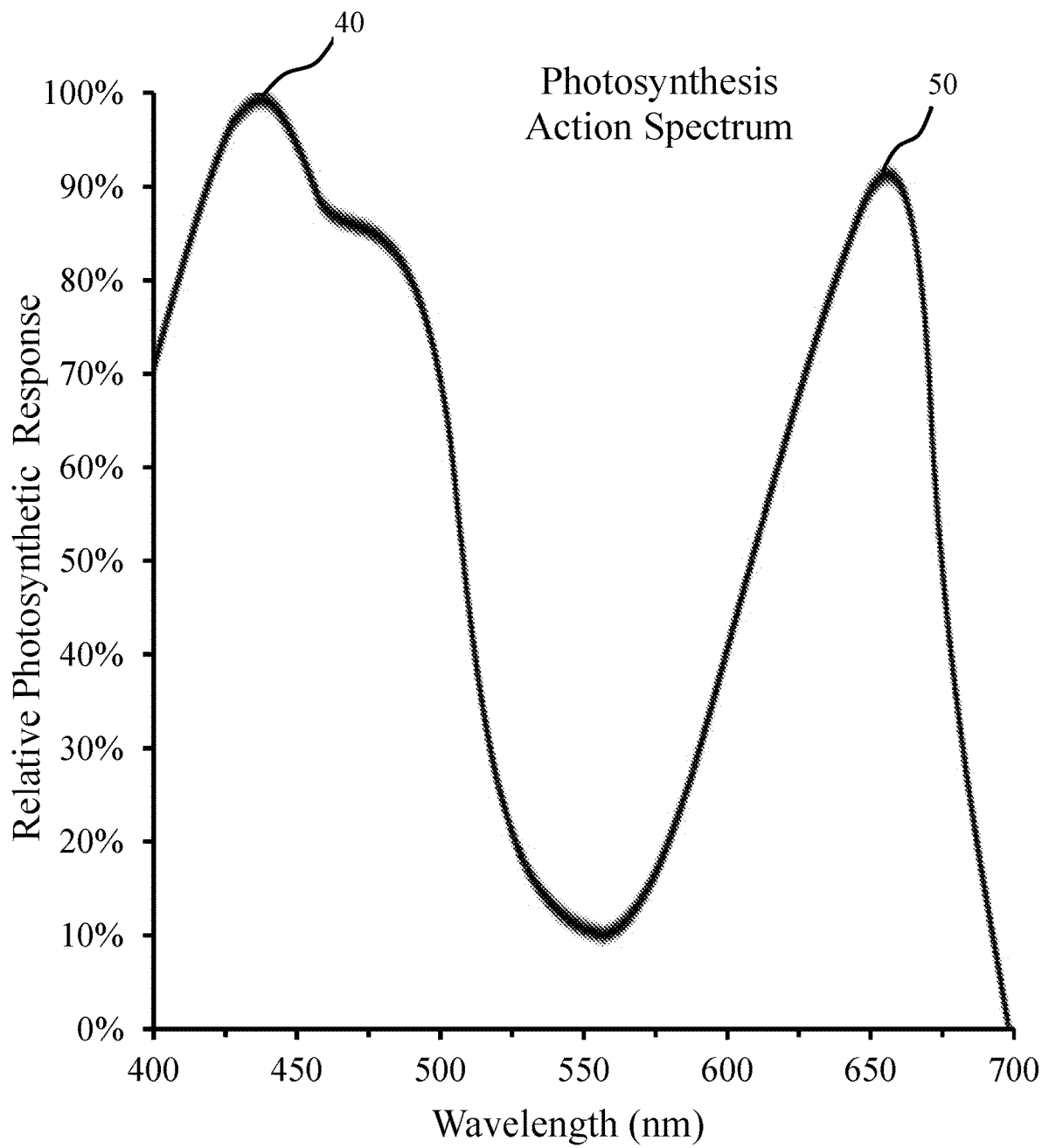
FIG. 1B is a Photosynthesis Action Spectrum (PAS), relative photosynthetic response (%) versus wavelength (nm)

FIG. 1B is a Photosynthesis Action Spectrum (PAS), relative photosynthetic response (%) versus wavelength (nm). The spectrum is an average spectrum for a plant including chlorophyll-a, chlorophyll-b and carotenoid (βcarotine) pigments. As is known, different plant species absorb light differently and consequently have different PAS. The PAS illustrated in FIG. 1B is an average of the PAS Curves of many different plant species.

As indicated in FIG. 1B, the PAS has a maximum value (100%) peak 40 at a wavelength around 440 nm in the blue light region of the spectrum and a second, lower, peak 50 at a wavelength around 675 nm in the red light region of the spectrum. For wavelengths between the peaks 40, 50 in the green to yellow region of the spectrum (540 nm to 570 nm) there is a deep trough in the PAS which reaches a minimum value around 550 nm. The trough in the PAS suggests that light in the green to yellow region of the spectrum contributes only minimally to plant photosynthesis.

Figure 1C:
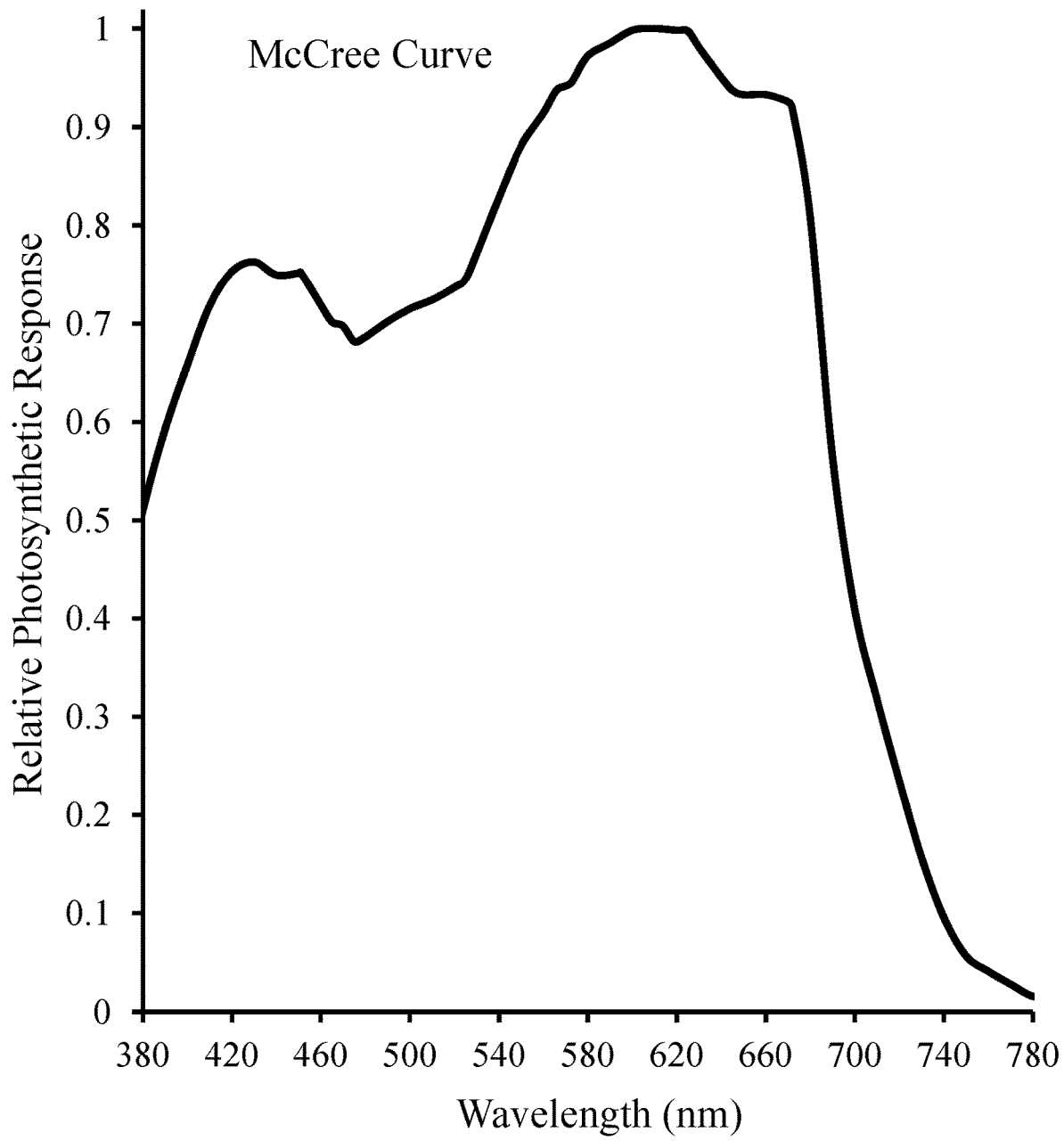
FIG. 1C is a McCree Curve, relative photosynthetic efficiency versus wavelength (nm)

FIG. 1C shows a McCree Curve, average photosynthetic response to absorbed photons at different wavelengths and is a plot of relative photosynthetic response versus wavelength (nm). As with the PAS, the McCree curve is a generalized (average) of the absorption curves of multiple different plants including chlorophyll-a, chlorophyll-b and carotenoid (βcarotine) pigments. As can be seen from FIG. 1C, the photosynthetic quantum yield has a maximum value (100%) for wavelength from about 600 nm to about 630 nm suggesting that, in contrast to the PAS (FIG. 1B) red light plays a greater role in photosynthesis rate than blue light. Moreover, the McCree Curve indicates that green to yellow light may also play a role in the photosynthesis process. The McCree curve closely resembles the spectrum of daylight/sunlight for wavelengths from 380 nm to 730 nm.

Both the PAS and McCree Curve indicate that the plant growth efficiency is not just photon intensity dependent but also wavelength dependent in the blue to cyan region from 400 nm to 520 nm where plants have the most absorption efficiency. Embodiments of the inventions concern solid-state light sources that generate light in the blue to cyan region whose spectral composition is configured to promote plant growth efficiency.

Photon Flux (PF), Photosynthetic Photon Flux (PPF), Photosynthesis Factor, and Photosynthetic Photon Efficacy (PPE)

As is known, Photon Flux (PF) is a measure of the total number of photons (Photon count) emitted per second by a light source. Typically, photon flux is calculated using all photon wavelengths of light.

Photosynthetic Photon Flux (PPF) is a measure of the total amount of photosynthetically active radiation generated by a light source; that is the photon flux (total number of photons emitted per second) by the source over wavelengths of the Photosynthetically Active Radiation (PAR) from 400 nm to 700 nm. The calculation assumes that no photosynthesis occurs at shorter or longer wavelengths. The photosynthetic photon flux of a light source, $PPF_{source}$, is given by:

$$PPF_{source} = \Sigma_{400}^{700} P(\lambda) \cdot d\lambda \ (\mu mol/s)$$

where $P(\lambda)$ is the spectral power distribution (SPD) of the source.

Photon Flux (Photon count per second) is given by:

$$\text{Photon Flux} = PPF_{source} \times N_A \times 1000 \ (s^{-1})$$

where $N_A$ is Avagadro's constant ($6.02214076 \times 10^{23}$).

The photosynthetic photon flux of light absorbed by a pigment (pig.), $PPF_{pig}$, is given by:

$$PPF_{pig} = \Sigma_{400}^{700} P(\lambda) \cdot B_{pig}(\lambda) \cdot d\lambda \ (\mu mol/s)$$

where $B(\lambda)$ is the absorption spectrum of the pigment.

The photosynthesis factor, which gives a measure of the amount of Photosynthetic Photon Flux absorbed by a pigment is given by:

$$\text{Photosynthesis Factor} = PPF_{pig}/PPF_{source} (\%).$$

Photosynthesis Photon Efficacy (PPE or Kp) gives a measure of the efficacy of plant lighting. PPE is the photosynthetic photon flux (PPF) of the light source divided by input electric power to the light source and is given by:

$$PPE_{source} = PPF_{source}/\text{electrical power} (\mu mol/J).$$

Grow-Light Sources (Light Emitting Devices)

As described herein, embodiments of the invention can comprise a grow-light source (light emitting device) for horticultural lighting comprising one or more blue solid-state light sources (LEDs) that generate light with a peak emission wavelength $\lambda_{pe}$ from 400 nm to 520 nm (blue to cyan). The peak emission wavelengths can be selected to correspond to the peak absorption wavelengths of chlorophyll and/or carotenoid pigments to promote photosynthesis and plant growth.

The one or more solid-state light sources may comprise one or more InGaN/GaN LED chips that may generate narrowband blue light, broadband blue light or full spectrum blue light. In embodiments, the one or more LED chips may be packaged in a SMD (Surface Mount Device) package.

Figure 2A:
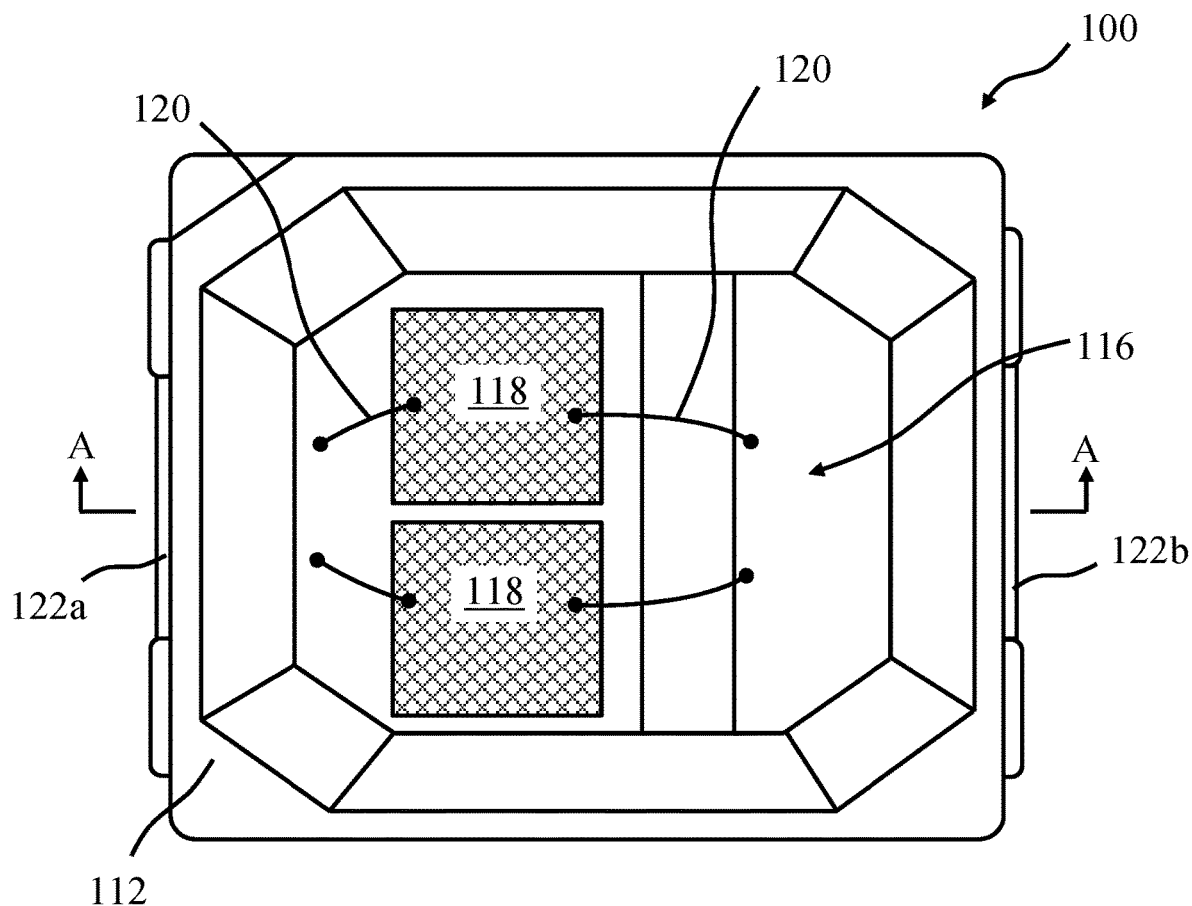
Figure 2B:
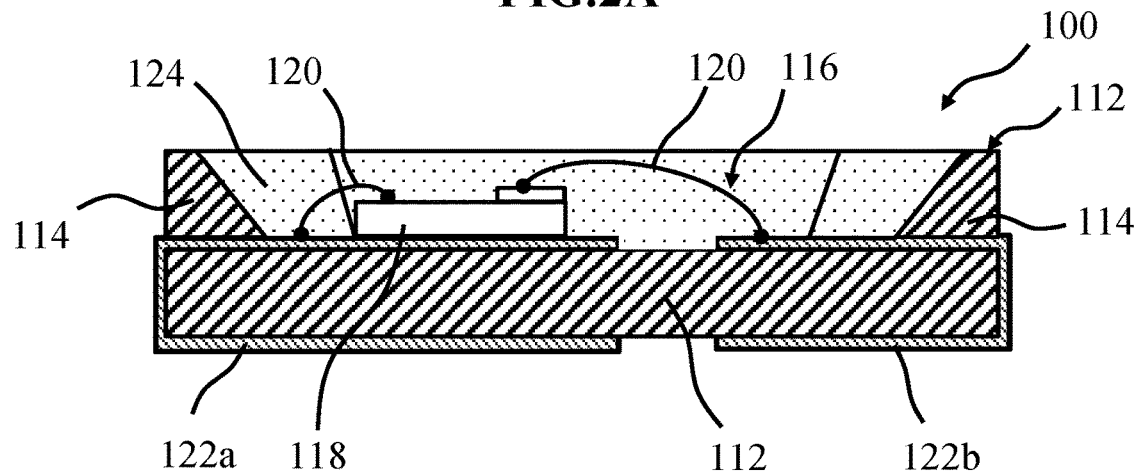

FIGS. 2A and 2B are schematic views of an SMD packaged light emitting device 100 in accordance with the invention in which FIG. 2A is a plan view of the device and FIG. 2B is a sectional side view through A-A.

The light emitting device 100 is a packaged-type device comprising a package 110, for example, an SMD (Surface Mounted Device) 2835 LED package. The package 110 comprises a base 112 and side walls 114 that extend upwardly from opposing edges of the base 112. The interior surfaces of the side walls 114 slope inwardly to their vertical axis in a direction towards the base 112 and, together with the interior surface (floor) of the base 112, define a cavity 116.

The cavity 116 contains one or more (2 as shown) InGaN-based LED dies (blue LED chips) 118 mounted on the floor (interior surface of the base) of the cavity 116. As indicated, the LED chips 118 can be electrically connected to the contact pads on the floor of the cavity by bond wires 120. The contact pads are electrically connected to contact pads on the base of the package 122a, 122b.

The cavity 116 is filled with a light transmissive (transparent) material (optical encapsulant) 124, such as silicone material. The light transmissive material 124 may contain light scattering particles or light diffusive materials.

Grow-Lights Comprising Narrowband Blue Solid-State Light Sources

As described herein, embodiments of the invention can comprise a grow-light (light emitting device) for horticultural lighting comprising one or more narrowband blue solid-state light sources that generate narrowband light with a peak emission wavelength $\lambda_{pe}$ from 400 nm to 520 nm (blue to cyan) and a FWHM from 10 nm to 25 nm. The peak emission wavelengths can be selected to correspond to the peak absorption wavelengths of chlorophyll and/or carotenoid pigments to promote photosynthesis and plant growth.

Solid-state light source, Dev. 1, is a narrowband blue solid-state light source in accordance with the invention that is configured to promote photosynthesis involving the chlorophyll-a pigment. Dev. 1 comprises a narrowband InGaN/GaN LED that generates a narrowband emission with a peak emission wavelength ($\lambda_{pe}$=436 nm) corresponding to the peak absorption wavelength of chlorophyll-a (about 430 nm) in the blue region of the spectrum.

The optical characteristics of the narrowband blue solid-state light source Dev. 1 are given in TABLE 1. As can be seen from the table, Dev. 1 has a peak emission wavelength $\lambda_{pe}$ of about 430 nm and a FWHM of about 12 nm.

Figure 3:
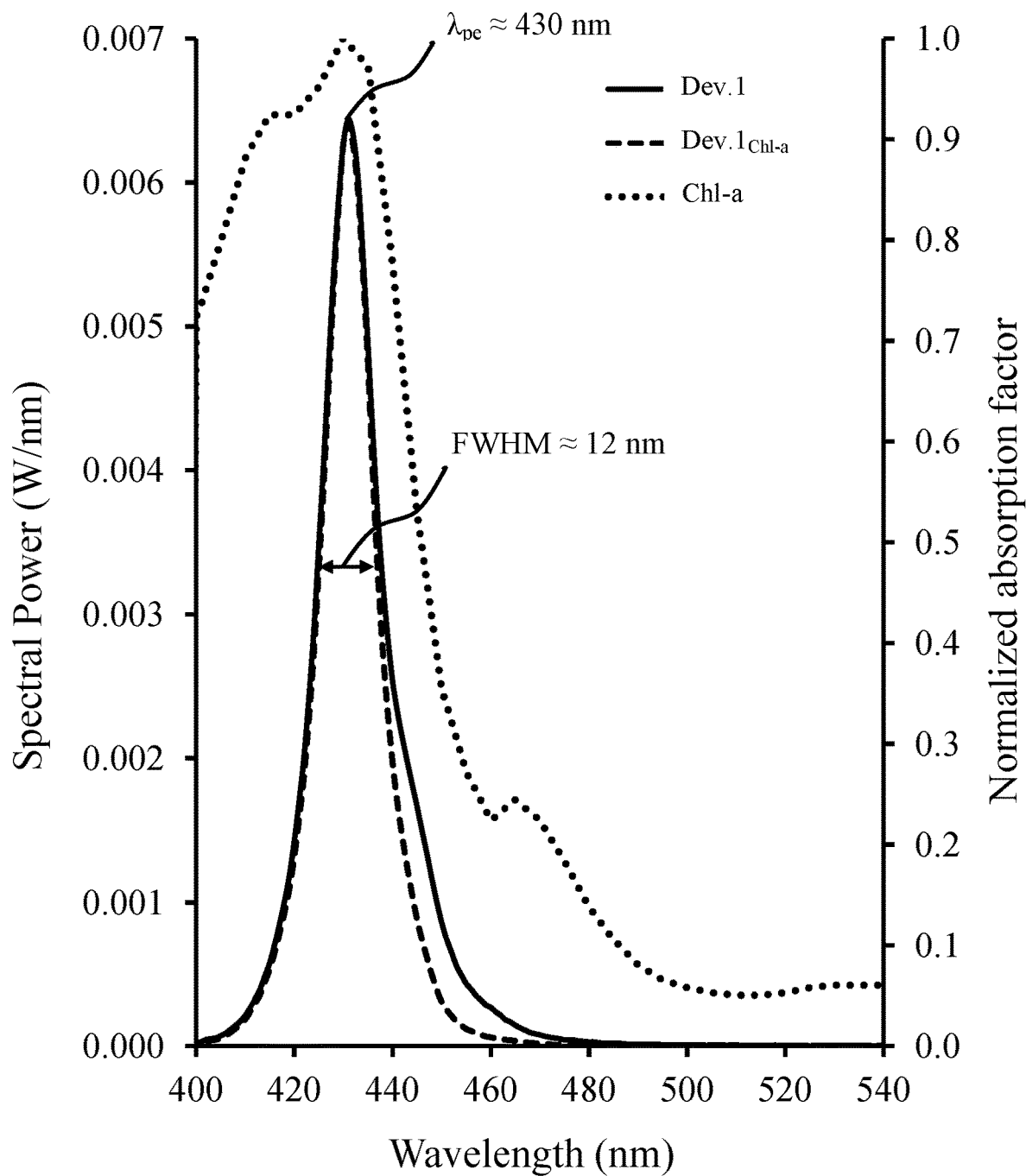
FIG. 3 shows normalized absorption spectrum, normalized absorption factor versus wavelength (nm), for chlorophyll-a (dotted line—Chl-a) and spectral power distribution, spectral power (W/nm) versus wavelength (nm), for (i) a narrowband blue solid-state light source Dev. 1 (solid line—Dev. 1) and (ii) light absorbed by chlorophyll-a (dashed line—Dev. $1_{Chl-a}$)

FIG. 3 shows spectral power distribution (SPD), spectral power (W/nm) versus wavelength (nm), for narrowband blue solid-state light source Dev. 1 (solid line—Dev. 1) and the SPD of light absorbed by chlorophyll-a (dashed line—Dev. $1_{Chl-a}$). The SPD of light absorbed by chlorophyll-a (Dev. $1_{Chl-a}$) is derived by scaling spectral power values of the SPD of Dev. 1 by the normalized absorption spectrum of Chl-a. The normalized absorption spectrum of Chl-a is the absorption spectrum of Chl-a that has been normalized so that it has a maximum absorption value equal to one. As a result, the spectral power values absorbed by chlorophyll-a should be multiplied by 0.66 to obtain absolute values. For visual comparison, FIG. 3 also includes the normalized absorption spectrum, normalized absorption factor versus wavelength for the chlorophyll-a pigment (dotted line—Chl-a).

The photosynthetic photon flux (PPF) generated by Dev. 1, $PPF_{Dev.1}$, is 0.4166 μmol/s. The PPF absorbed by Chl-a pigment, $PPF_{Chl-a}$, is 0.2342 μmol/s giving a photosynthesis factor ($PPF_{Chl-a}/PPF_{Dev.1}$) of 56%. In TABLE 1, the values in parenthesis are calculated using the normalized absorption spectrum. The photosynthetic photon efficacy (PPE) of Dev. 1, $PPE_{Dev.1}$, is 2.4353 μmol/J.

TABLE 1

Optical characteristics of solid-state light source Dev.1 @ 25° C. and chlorophyll-a (Chl-a)

| $\lambda_{pe}$ (nm) | FWHM (nm) | $PPF_{Dev.1}$ (μmol/s) | $PPF_{Chl-a}$ (μmol/s) | Photosynthesis Factor (%) | $PPE_{Dev.1}$ (μmol/J) |
|---|---|---|---|---|---|
| 430 | 12 | 0.4166 | 0.2342 (0.3549) | 56 (85) | 2.4353 |

Narrowband blue solid-state light source, Dev. 2, is a narrowband solid-state light source in accordance with the invention that is configured to promote photosynthesis involving the chlorophyll-b pigment. Dev. 2 comprises a narrowband InGaN LED that generates a narrowband emission with a peak emission wavelength ($\lambda_{pe}$=461 nm) corresponding to the peak absorption wavelength of chlorophyll-b (about 465 nm) in the blue region of the spectrum.

The optical characteristics of the narrowband blue solid-state light source Dev. 2 are given in TABLE 2. As can be seen from the table Dev. 2 has a peak emission wavelength $\lambda_{pe}$ of about 468 nm and a FWHM of about 18 nm.

Figure 4:
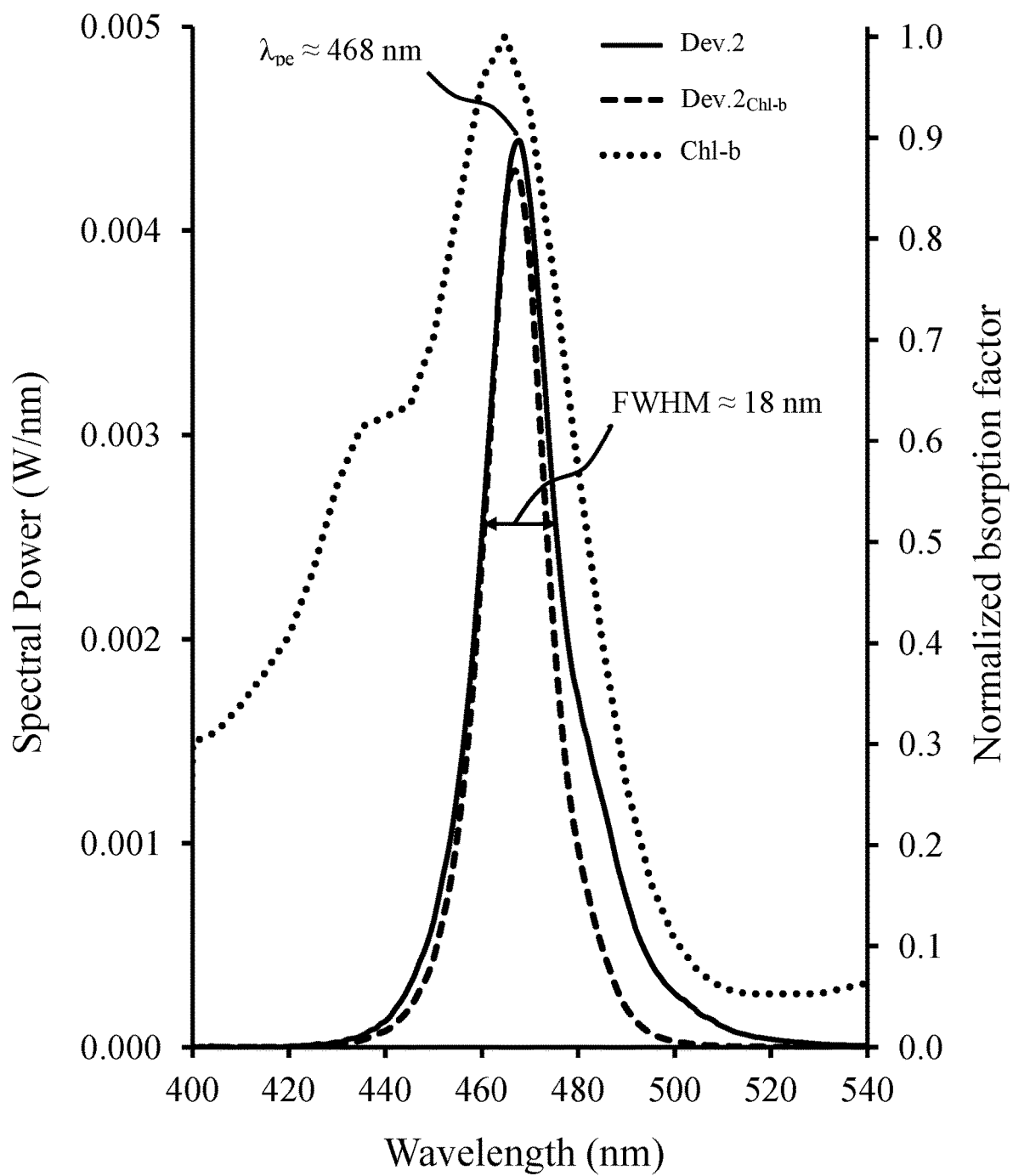
FIG. 4 shows normalized absorption spectrum, normalized absorption factor versus wavelength (nm), for chlorophyll-b (dotted line—Chl-b) and spectral power distribution, spectral power (W/nm) versus wavelength (nm), for (i) a narrowband blue solid-state light source Dev. 2 (solid line—Dev. 2) and (ii) light absorbed by chlorophyll-b (dashed line—Dev. $2_{Chl-b}$)

FIG. 4 shows spectral power distribution (SPD), spectral power (W/nm) versus wavelength (nm), for Dev. 2 (solid line—Dev. 2) and the SPD of light absorbed by chlorophyll-b (dashed line—Dev. $2_{Chl-b}$). The SPD of light absorbed by chlorophyll-b (Dev. $2_{Chl-b}$) is derived by scaling spectral power values of the SPD of Dev. 2 by the normalized absorption spectrum of Chl-b. The normalized absorption spectrum of Chl-b is the absorption spectrum of Chl-b that has been normalized so that it has a maximum absorption value equal to one. As a result, the spectral power values absorbed by chlorophyll-b should be scaled by 0.85 to obtain absolute values. For comparison, FIG. 4 also includes the normalized absorption spectrum, normalized absorption factor versus wavelength for the chlorophyll-b pigment (dotted line—Chl-b).

The photosynthetic photon flux (PPF) generated by Dev. 2, $PPF_{Dev.2}$ is 0.4147 μmol/s. The PPF absorbed by Chl-b, $PPF_{Chl-b}$, is 0.28543 μmol/s giving a photosynthesis factor ($PPF_{Chl-b}/PPF_{Dev.2}$) of 69%. In TABLE 2, the values in parenthesis are calculated using the normalized absorption spectrum. The photosynthetic photon efficacy (PPE) of Dev. 2, $PPE_{Dev.2}$, is 2.5108 μmol/J.

TABLE 2

Optical characteristics of solid-state light source Dev.2 @ 25° C. and chlorophyll-b (Chl-b)

| $\lambda_{pe}$ (nm) | FWHM (nm) | $PPF_{Dev.2}$ (μmol/s) | $PPF_{Chl-b}$ (μmol/s) | Photosynthesis factor (%) | $PPE_{Dev.2}$ (μmol/J) |
|---|---|---|---|---|---|
| 468 | 18 | 0.4147 | 0.28543 (0.3358) | 69 (81) | 2.5108 |

Grow-Lights Comprising Broadband Blue Solid-State Light Sources

As described herein, embodiments of the invention can comprise a grow-light (light emitting device) for horticultural lighting comprising one or more broadband solid-state light source that generates broadband light with a peak emission wavelength $\lambda_{pe}$ from 400 nm to 520 nm (blue to cyan) and a FWHM of from 30 nm to 60 nm. The peak emission wavelengths can be selected to correspond to the peak absorption wavelengths of chlorophyll and/or carotenoid pigments to promote photosynthesis and plant growth.

Broadband blue solid-state light source Dev. 3 is a broadband solid-state light source in accordance with the invention that is configured to promote photosynthesis involving the chlorophyll-a pigment. Dev. 3 comprises a broadband InGaN/GaN LED comprising multiple quantum wells (MQWs) that generate different wavelength narrowband blue emissions that in combination generate a broadband emission with a peak emission wavelength corresponding to the peak absorption wavelength of chlorophyll-a (about 430 nm) in the blue region of the spectrum.

The optical characteristics of the broadband blue solid-state light source Dev. 3 are given in TABLE 3. As can be seen from the table, Dev. 3 has a peak emission wavelength $\lambda_{pe}$ of about 432 nm and a FWHM of about 38 nm.

Figure 5:
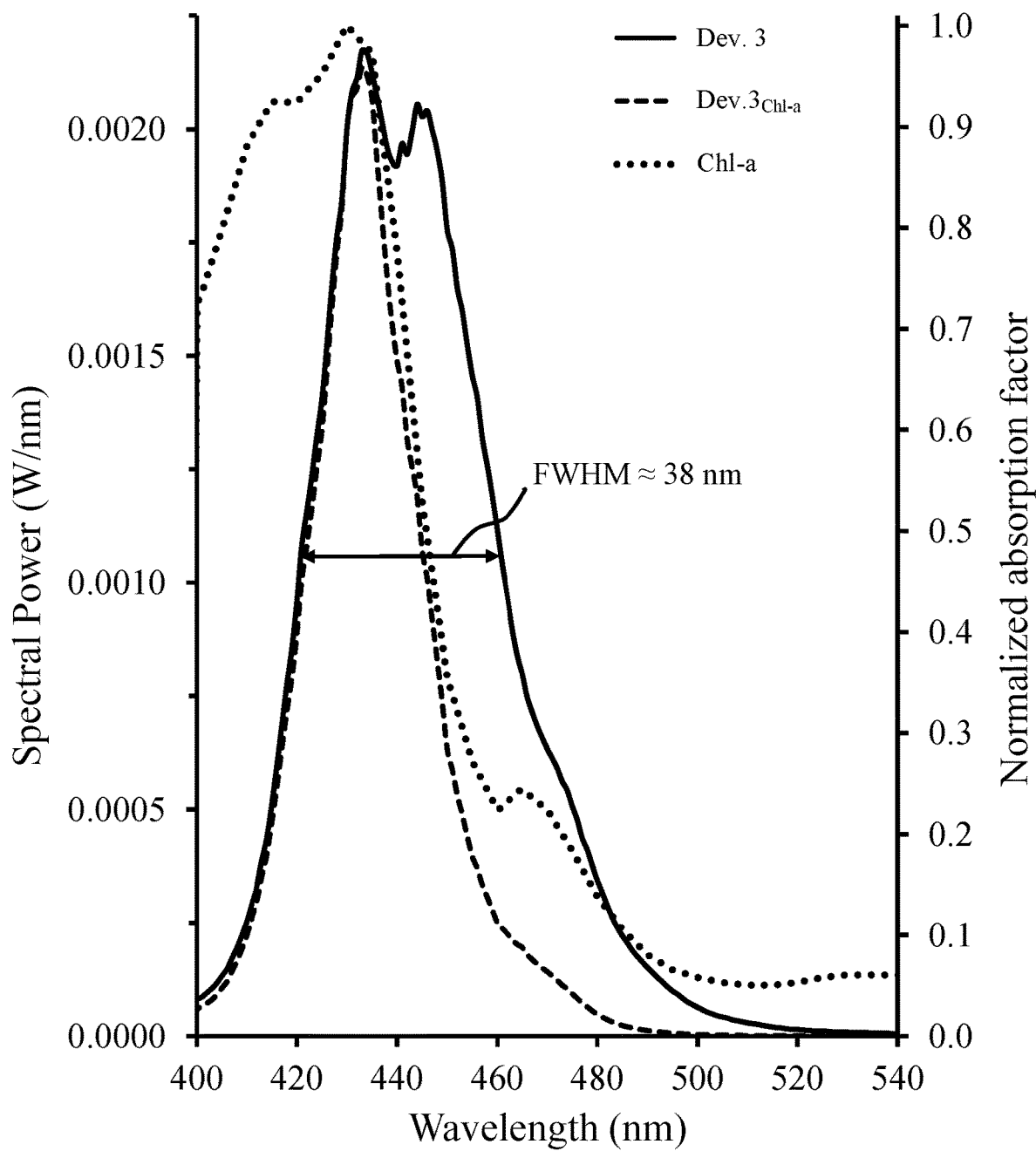
FIG. 5 shows normalized absorption spectrum, normalized absorption factor versus wavelength (nm), for chlorophyll-a (dotted line—Chl-a) and spectral power distribution, spectral power (W/nm) versus wavelength (nm), for (i) a broadband blue solid-state light source Dev. 3 (solid line—Dev. 3) and (ii) light absorbed by chlorophyll-a (dashed line—Dev. $3_{Chl-a}$)

FIG. 5 shows spectral power distribution (SPD), spectral power (W/nm) versus wavelength (nm), for Dev. 3 (solid line—Dev. 1) and the SPD of light absorbed by chlorophyll-a (dashed line—Dev. $3_{Chl-a}$). The SPD of light absorbed by chlorophyll-a (Dev. $3_{Chl-a}$) is derived by scaling spectral power values of the SPD of Dev. 3 by the normalized absorption spectrum of Chl-a. The normalized absorption spectrum of Chl-a is the absorption spectrum of Chl-a that has been normalized so that it has a maximum absorption value equal to one. As a result, to obtain absolute spectral power values absorbed by chlorophyll-a, the spectral power value should be scaled by 0.66. For comparison, FIG. 5 also includes the normalized absorption spectrum, normalized absorption factor versus wavelength for the chlorophyll-a pigment (dotted line—Chl-a).

The photosynthetic photon flux (PPF) generated by Dev. 3, $PPF_{Dev.3}$, is 0.3464 μmol/s. The PPF absorbed by Chl-a, $PPF_{Chl-a}$, is 0.1379 μmol/s giving a photosynthesis factor ($PPF_{Chl-a}/PPF_{Dev.3}$) of 40%. In TABLE 3, the values in parenthesis are calculated using the normalized absorption spectrum. The photosynthetic photon efficacy (PPE) of Dev. 3, $PPE_{Dev.3}$, is 2.0149 μmol/J.

TABLE 3

Optical characteristics of solid-state light source Dev.3 @ 85° C. and chlorophyll-a (Chl-a)

| $\lambda_{pe}$ (nm) | FWHM (nm) | PPF$_{Dev.3}$ (µmol/s) | PPF$_{Chl-a}$ (µmol/s) | Photosynthesis factor (%) | PPE$_{Dev.3}$ (µmol/J) |
|---|---|---|---|---|---|
| 433 | 38 | 0.3464 | 0.1379 (0.2089) | 40 (60) | 2.0149 |

Broadband blue solid-state light source Dev. 4 is a solid-state light source in accordance with the invention that is configured to promote photosynthesis involving the chlorophyll-b pigment. Dev. 4 comprises a broadband InGaN/GaN LED comprising multiple quantum wells (QWs) that generate different wavelength narrowband components that in combination generate a broadband emission with a peak emission wavelength corresponding to the peak absorption wavelength of chlorophyll-b (about 465 nm) in the blue region of the spectrum.

The optical characteristics of the broadband blue solid-state light source Dev. 4 are given in TABLE 4. As can be seen from the table, Dev. 4 has a peak emission wavelength $\lambda_{pe}$ of about 462 nm and a FWHM of about 41 nm.

Figure 6:
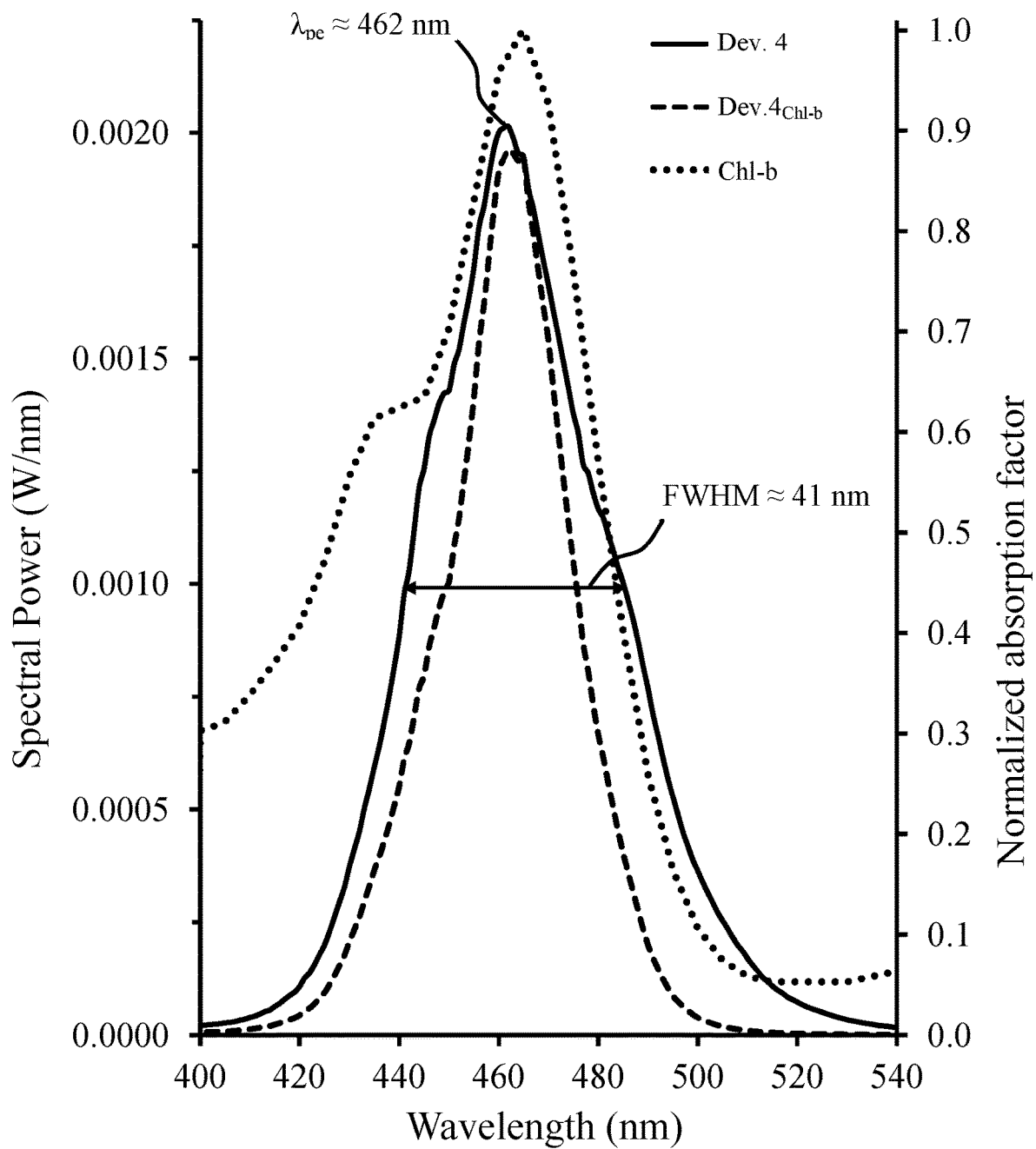
FIG. 6 shows normalized absorption spectrum, normalized absorption factor versus wavelength (nm), for chlorophyll-b (dotted line—Chl-b) and spectral power distribution, spectral power (W/nm) versus wavelength (nm), for (i) a broadband blue solid-state light source Dev. 4 (solid line—Dev. 4) and (ii) light absorbed by chlorophyll-b (dashed line—Dev. $4_{Chl-b}$)

FIG. 6 shows spectral power distribution (SPD), spectral power (W/nm) versus wavelength (nm), for Dev. 4 (solid line—Dev. 4) and the SPD of light absorbed by chlorophyll-b (dashed line—Dev. $4_{Chl-b}$). The SPD of light absorbed by chlorophyll-b (Dev. $4_{Chl-b}$) is derived by scaling spectral power values of the SPD of Dev. 1 by the normalized absorption spectrum of Chl-b. The normalized absorption spectrum of Chl-b is the absorption spectrum of Chl-b that has been normalized so that it has a maximum absorption value equal to one. As a result, to obtain absolute spectral power values absorbed by chlorophyll-b, the spectral power value should be scaled by 0.85. For comparison, FIG. 6 also includes the normalized absorption spectrum, normalized absorption versus wavelength for the chlorophyll-b pigment (dotted line—Chl-b).

The photosynthetic photon flux (PPF) generated by Dev. 4, PPF$_{Dev.4}$, is 0.3503 µmol/s. The PPF absorbed by Chl-b, PPF$_{Chl-b}$, is 0.2025 µmol/s giving a photosynthesis factor (PPF$_{Chl-b}$/PPF$_{Dev.4}$) of 58%. In TABLE 4, the values in parenthesis are calculated using the normalized absorption spectrum. The photosynthetic photon efficacy (PPE) of Dev. 4, PPE$_{Dev.4}$, is 2.0995 µmol/J.

TABLE 4

Optical characteristics of solid-state light source Dev.4 @ 85° C. and chlorophyll-b (Chl-b)

| $\lambda_{pe}$ (nm) | FWHM (nm) | PPF$_{Dev.4}$ (µmol/s) | PPF$_{Chl-b}$ (µmol/s) | Photosynthesis factor (%) | PPE$_{Dev.4}$ (µmol/J) |
|---|---|---|---|---|---|
| 462 | 41 | 0.3503 | 0.2025 (0.2382) | 58 (68) | 2.0995 |

Broadband blue solid-state light source Dev. 5 is a solid-state light source in accordance with the invention that is configured to promote photosynthesis involving the carotenoid pigment. Dev. 5 comprises an broadband InGaN/GaN LED comprising multiple quantum wells (QWs) that generate different wavelength narrowband components that in combination generate broadband emission peaks with peak emission wavelength corresponding to the peak absorption wavelengths (about 457 nm and about 487 nm) of carotenoid.

The measured optical characteristics of the broadband solid-state light source Dev. 5 are given in TABLE 5. As can be seen from the table, Dev. 5 has a maximum emission peak at a peak emission wavelength $\lambda_{pe}$ of about 495 nm and a FWHM of about 56 nm.

Figure 7:
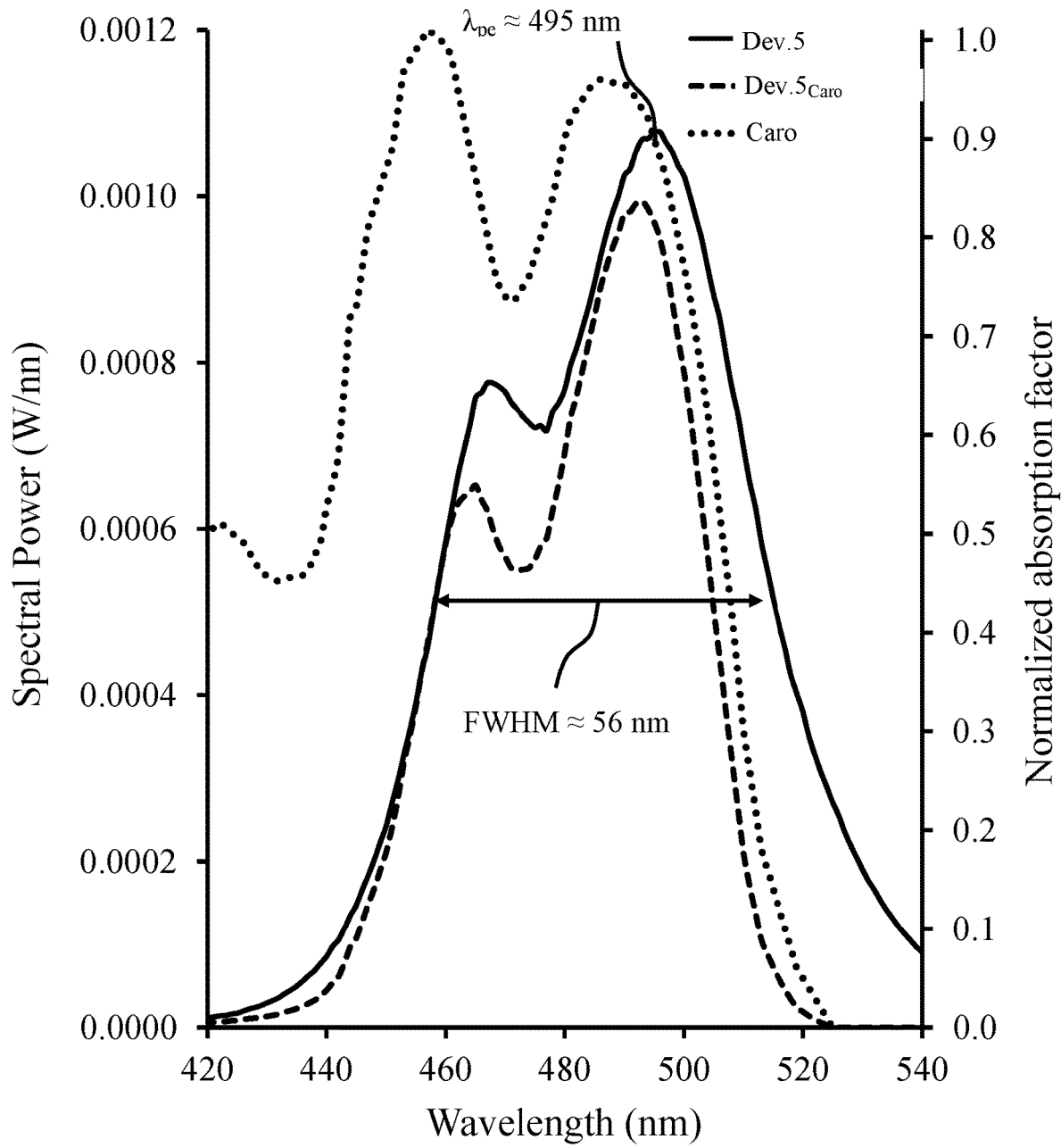
FIG. 7 shows normalized absorption spectrum, normalized absorption factor versus wavelength (nm), for carotenoid (dotted line—Caro) and spectral power distribution, spectral power (W/nm) versus wavelength (nm), for (i) a broadband blue solid-state light source Dev. 5 (solid line—Dev. 5) and (ii) light absorbed by carotenoid (dashed line—Dev. $5_{Caro}$)

FIG. 7 shows spectral power distribution (SPD), spectral power (W/nm) versus wavelength (nm), for Dev. 5 (solid line—Dev. 5) and the SPD of light absorbed by carotenoid (dashed line—Dev. $5_{caro}$). The SPD of light absorbed by carotenoid (Dev. $5_{caro}$) is derived by scaling spectral power values of the SPD of Dev. 5 by the normalized absorption spectrum of Caro. The normalized absorption spectrum of Caro is the absorption spectrum of Caro that has been normalized so that it has a maximum absorption value equal to one. As a result, to obtain absolute spectral power values absorbed by carotenoid, the spectral power value should be scaled by 0.62. For comparison, FIG. 7 also includes the absorption spectrum, absorption versus wavelength for the carotenoid pigment (dotted line—Caro). As can be seen from FIG. 7, Dev. 6 generates a second broadband peak at 467 nm with a FWHM of about 25 nm.

The photosynthetic photon flux (PPF) generated by Dev. 5, PPF$_{Dev.5}$, is 0.2221 µmol/s. The PPF absorbed by Caro, PPF$_{caro}$, is 0.1027 µmol/s giving a photosynthesis factor (PPF$_{caro}$/PPF$_{Dev.5}$) of 47%. In TABLE 5, the values in parenthesis are calculated using the normalized absorption spectrum. The photosynthetic photon efficacy (PPE) of Dev. 5, PPE$_{Dev.5}$, is 1.4246 µmol/J.

TABLE 5

Optical characteristics of solid-state light source Dev.5 @ 85° C. and carotenoid (Caro)

| $\lambda_{pe}$ (nm) | FWHM (nm) | PPF$_{Dev.5}$ (µmol/s) | PPF$_{Caro}$ (µmol/s) | Photosynthesis factor (%) | PPE$_{Dev.5}$ (µmol/J) |
|---|---|---|---|---|---|
| 495 | 56 | 0.2221 | 0.1027 (0.1657) | 47 (75) | 1.4246 |

In other embodiments, the solid-state light source for carotenoid may comprise two broadband LEDs for generating light with a peak emission wavelength corresponding to a respective one of the carotenoid absorption peak wavelengths.

White Grow-Light: Broadband Blue Solid-State Light Source

Dev. 6 is a white light emitting device (grow-light) in accordance with the invention that utilizes a broadband blue solid-state light source and is configured to promote photosynthesis involving the chlorophyll-a pigment. The broadband solid-state light source comprises a broadband InGaN/GaN LED comprising multiple quantum wells (MQWs) that generate different wavelength narrowband components that in combination generate a broadband emission with a peak emission wavelength corresponding to the peak absorption wavelength of chlorophyll-a (about 430 nm) in the blue region of the spectrum.

The white light emitting device Dev. 6 may comprise a packaged device such as that illustrated in FIGS. 2a and 2B and comprise a 2835 SMD package containing a single broadband blue LED, a red photoluminescence material that generates light with a peak emission wavelength in orange to red (from about 640 nm to about 675 nm) region of the spectrum corresponding to the red absorption peak of chlorophyll-a, and a green to yellow photoluminescence material that generates light with a peak emission wavelength in the green to yellow (from about 540 nm to about 600 nm) region of the spectrum. More particularly, Dev. 6 comprises a Calcium Aluminum Silicon Nitride phosphor (CASN) of general formula $CaAlSiN_3:Eu^{2+}$ with a peak emission wavelength of about 615 nm and a YAG based phosphor with a peak emission wavelength of about 540 nm to 560 nm. In operation, the light emitting device Dev. 6 generates white light comprising a combination of blue light generated by the solid-state light source and yellow and red photoluminescence light generated by the phosphor materials.

Figure 8:
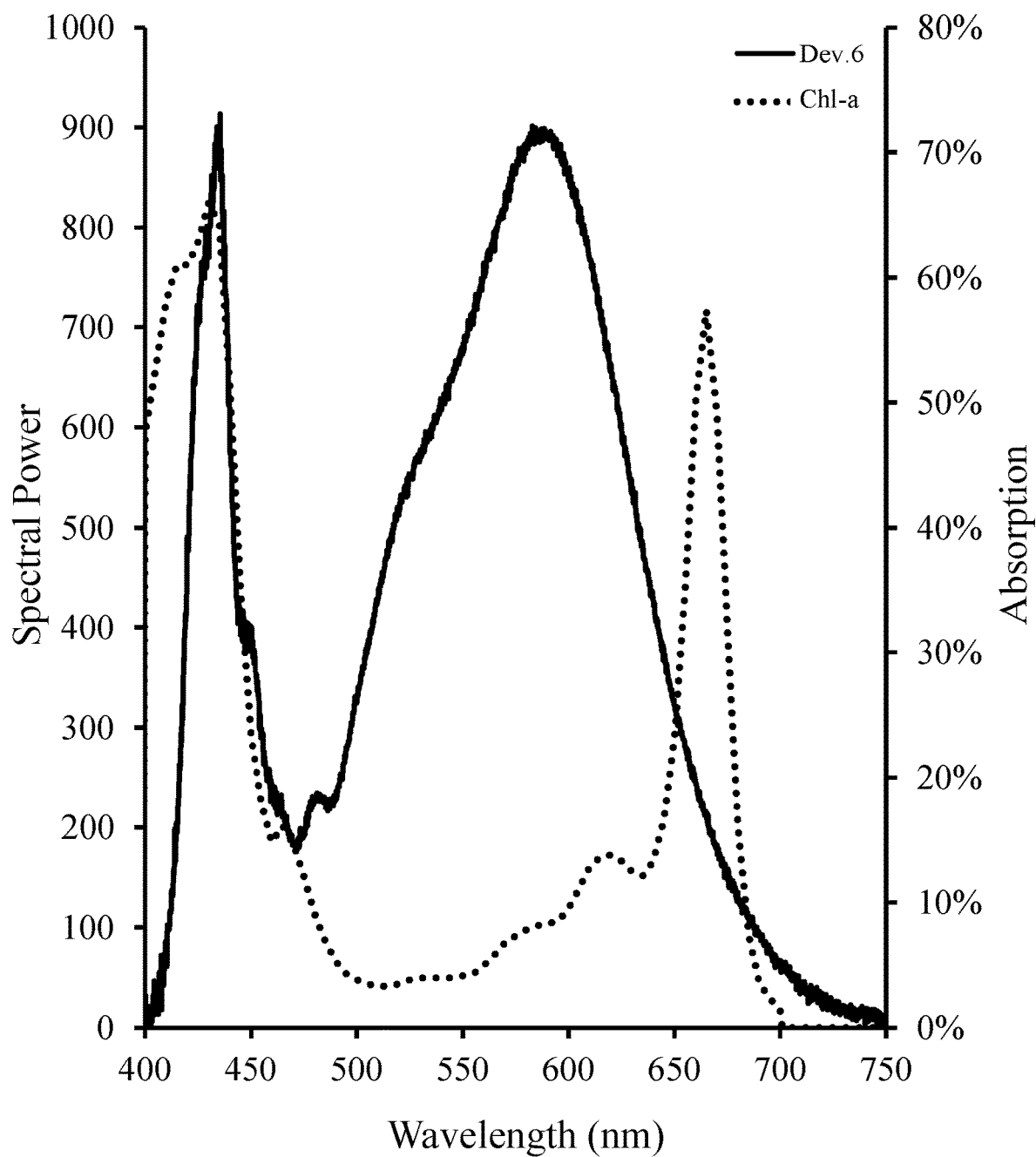
FIG. 8 shows spectral power distribution, spectral power versus wavelength (nm) for a white light emitting device (grow-light) Dev. 6 (solid line—Dev. 6) utilizing a broadband blue solid-state light source and absorption spectrum, absorption (%) versus wavelength (nm), for chlorophyll-a pigment (dotted line—Chl-a)
Figure 9:
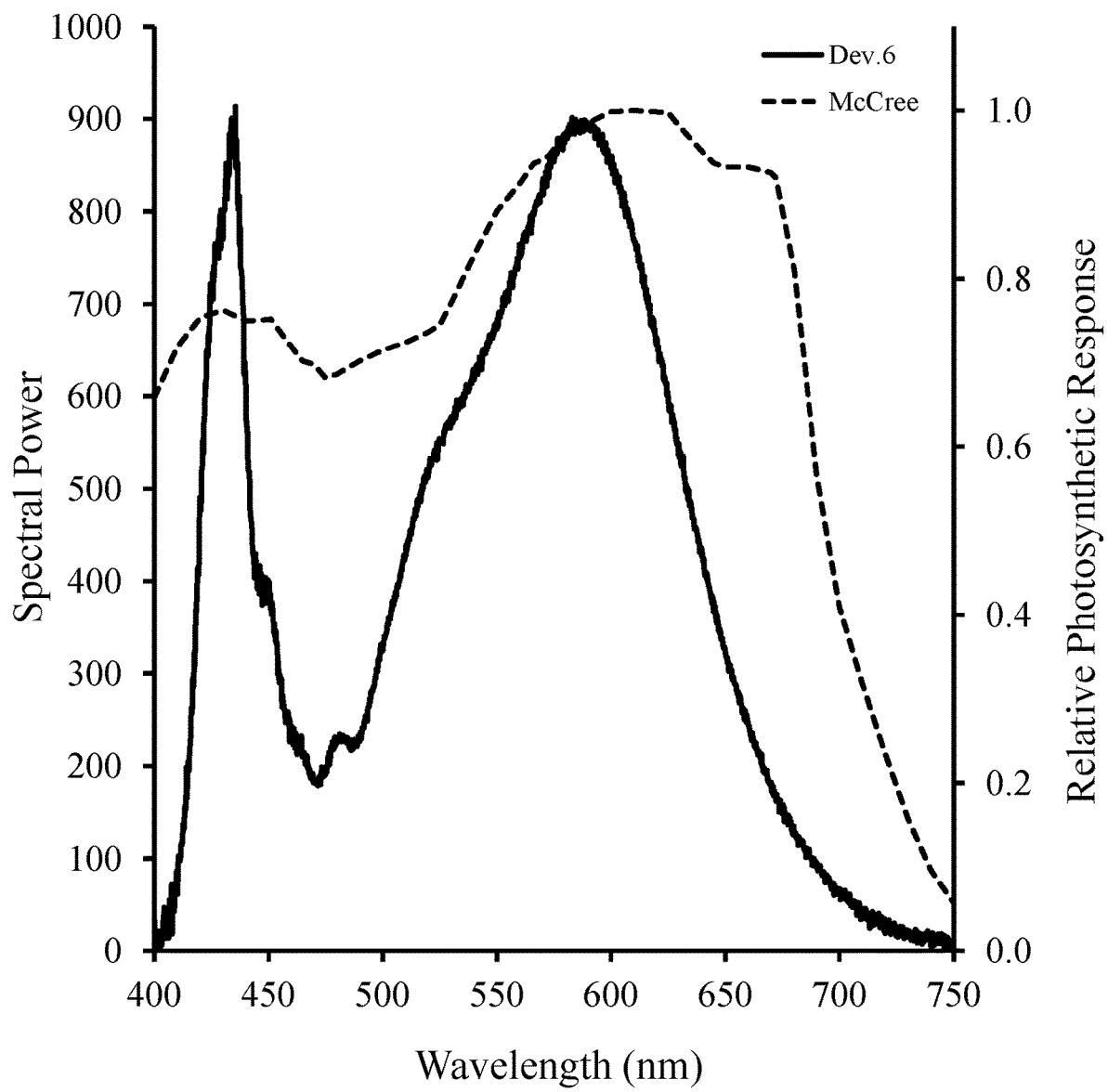
FIG. 9 shows spectral power distribution, spectral power versus wavelength (nm) for Dev. 6 (solid line—Dev. 6) and McCree Curve (dashed line—McCree)

FIG. 8 shows spectral power distribution, spectral power versus wavelength (nm) for the white light emitting device (grow-light) Dev. 6 (solid line—Dev. 6) and the absorption spectrum, absorption (%) versus wavelength (nm), for chlorophyll-a pigment (dotted line—Chl-a). FIG. 9 shows spectral power distribution, spectral power versus wavelength (nm) for Dev. 6 (solid line—Dev. 6) and the McCree curve (dashed line—McCree). As can be seen from FIG. 9, white light generated by Dev. 6 has a spectral composition whose shape substantially matches that of the McCree Curve. Such a correspondence in spectral composition promotes photosynthesis as well as increase PPF efficacy of the device.

Grow-Lights Comprising Broadband Full Spectrum Blue Solid-State Light Source

As described herein embodiments of the invention can comprise a light emitting device (grow-light) for horticultural lighting comprising a full spectrum blue solid-state light source that generates full spectrum blue light that generate light whose spectral composition more closely matches (resembles) sunlight/daylight at wavelengths in the blue to cyan region of the spectrum, more specifically for wavelengths from 400 nm to 520 nm of the Photosynthetically Active Radiation (PAR). More specifically, broadband full spectrum blue light has a flat emission maxima whose intensity is substantially constant (varies less than about 10%) over a wavelength range of at least 40 nm. Full Spectrum Blue solid-state light sources may comprise multiple broadband solid-state light sources.

Full spectrum blue solid-state light source Dev. 7 is a full spectrum blue light source in accordance with the invention that is configured to promote photosynthesis involving both chlorophyll-a (Chl-a) and chlorophyll-b (Chl-b). Dev. 7 comprises a combination of two InGaN/GaN MQW broadband blue LEDs. The first broadband LED generates blue light with a peak emission wavelength of 432 nm. The second broadband LED generates blue light with a peak emission wavelength of 451 nm. The peak emission wavelengths of the broadband blue LEDs are selected such that Dev. 7 has a peak emission wavelength lying between the peak absorption wavelengths of chlorophyll-a and chlorophyll-b (430 nm and 465 nm).

A particular advantage of using a single broadband MQW LED chip to generate broadband blue light, as compared to using multiple narrowband Blue LED chips, is a substantial reduction in the numbers of LEDs required to generate the broad blue emission. This is particularly important in horticultural applications where the most popular SMD (Surface Mount Device) package 2835 or 3030 which have about a 6 mm square light emitting area and can accommodate one to three LED chips, for example three middle power chips or one high power chip. The maximum FWHM that can be achieved by three narrowband blue chips are about 45 nm. While large form factor packages such as COB (Chip On Board) can achieve greater FWHM using three or more chips, such packaged devices are not compatible with linear area lighting required in horticulture applications. Furthermore, multiple die bonding in packaging manufacture will increase cost and reduce production rate.

Figure 10:
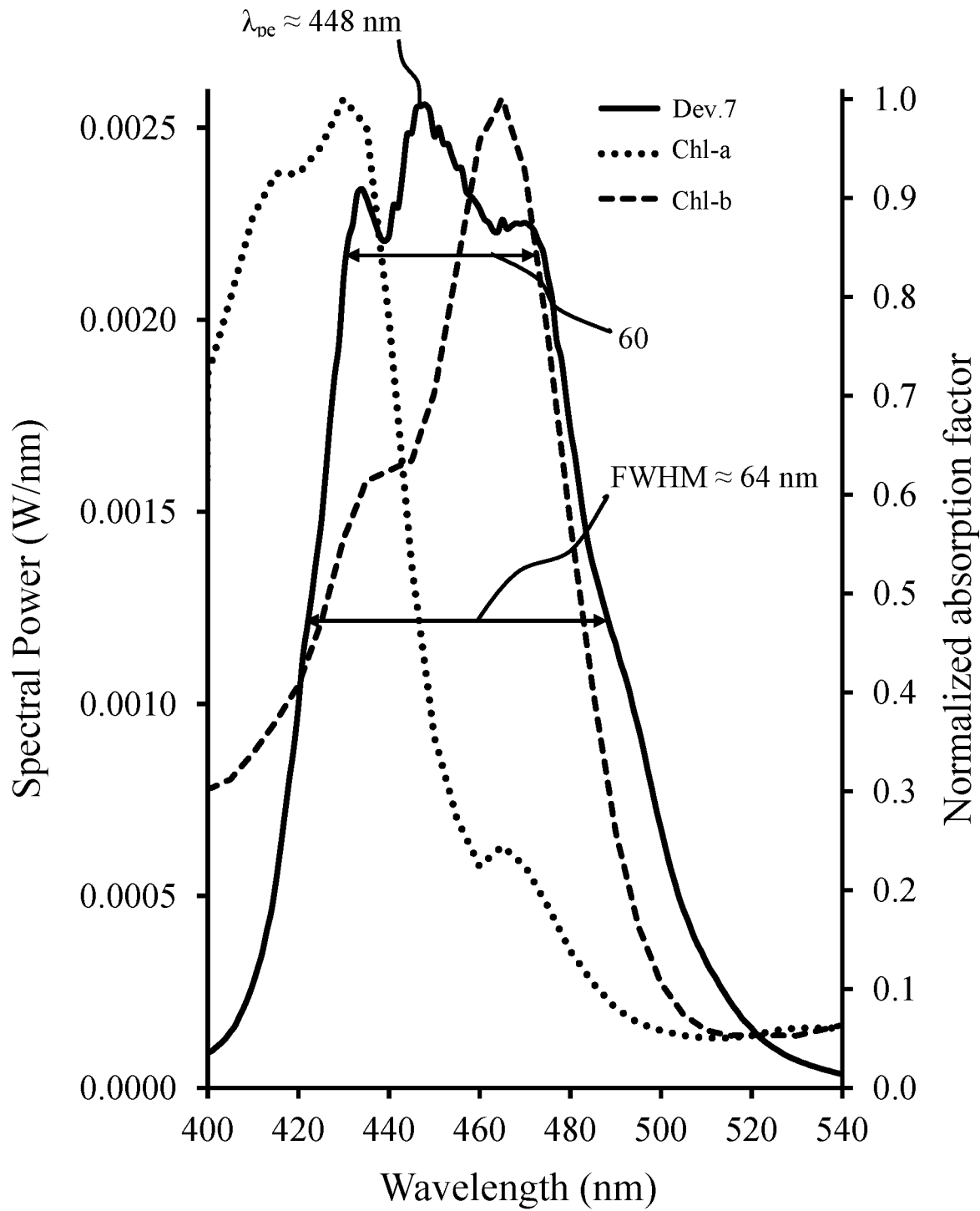
FIG. 10 shows normalized absorption spectra, normalized absorption factor versus wavelength (nm), for chlorophyll-a (dotted line—Chl-a) and chlorophyll-b (dashed line—Chl-b) and spectral power distribution, spectral power (W/nm) versus wavelength (nm), for a broadband full spectrum blue solid-state light source Dev. 7 (solid line—Dev. 7)

The optical characteristics of the broadband full spectrum blue solid-state light source Dev. 6 are given in TABLE 6. As can be seen from the table, Dev. 7 has a maximum emission peak at a peak emission wavelength e of about 448 nm and a FWHM of about 64 nm. FIG. 10 shows spectral power distribution (SPD), spectral power (W/nm) versus wavelength (nm), for Dev. 7 (solid line—Dev. 7) and normalized absorption spectra, normalized absorption factor versus wavelength (nm), for chlorophyll-a (dotted line—Chl-a) and chlorophyll-b (dashed line—Chl-b). As can be seen from FIG. 10, the spectral power distribution of light generated by Dev. 7 comprises a broadband emission with a flattened (clipped) emission maxima 60 whose spectral power is substantially constant (varies less than about 10%) for wavelength from about 430 nm to about 470 nm.

Figure 11:
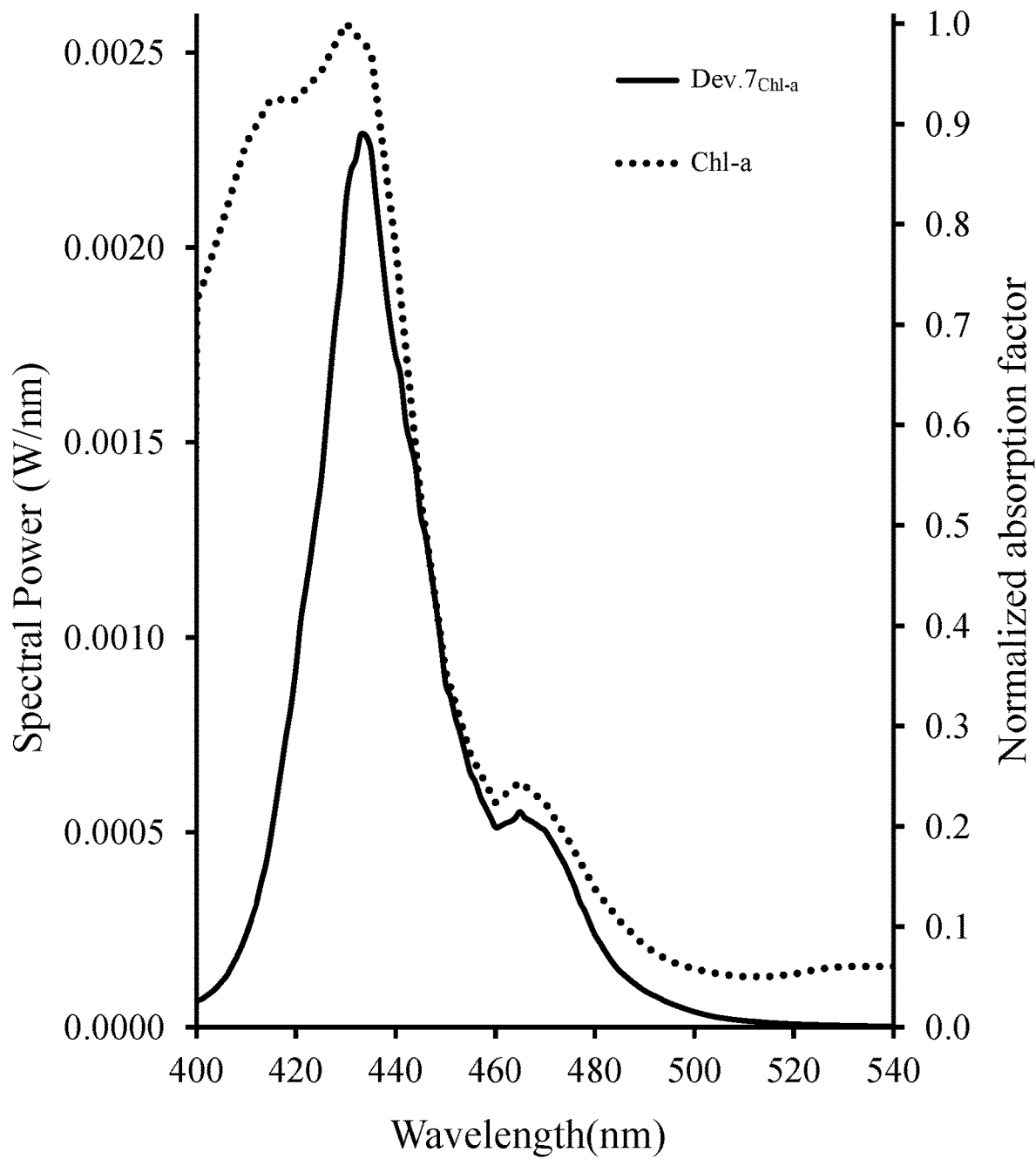
FIG. 11 shows normalized absorption spectrum, normalized absorption factor versus wavelength (nm), for chlorophyll-a (dotted line—Chl-a) and spectral power distribution, intensity (W/nm) versus wavelength (nm), for light absorbed by chlorophyll-a (solid line—Dev. $7_{Chl-a}$)

FIG. 11 shows spectral power distribution (SPD), spectral power (W/nm) versus wavelength (nm), of light absorbed by chlorophyll-a (solid line—Dev. $7_{Chl-a}$). The SPD of light absorbed by chlorophyll-a (Dev. $6_{Chl-a}$) is derived by scaling spectral power values of the SPD of Dev. 7 by the normalized absorption spectrum of Chl-a. The normalized absorption spectrum of Chl-a is the absorption spectrum of Chl-a that has been normalized so that it has a maximum absorption value equal to one. As a result, to obtain absolute spectral power values absorbed by chlorophyll-a, the spectral power value should be scaled by 0.66. For comparison, FIG. 11 also includes the normalized absorption spectrum, normalized absorption factor versus wavelength, for the chlorophyll-a pigment (dotted line—Chl-a).

Figure 12:
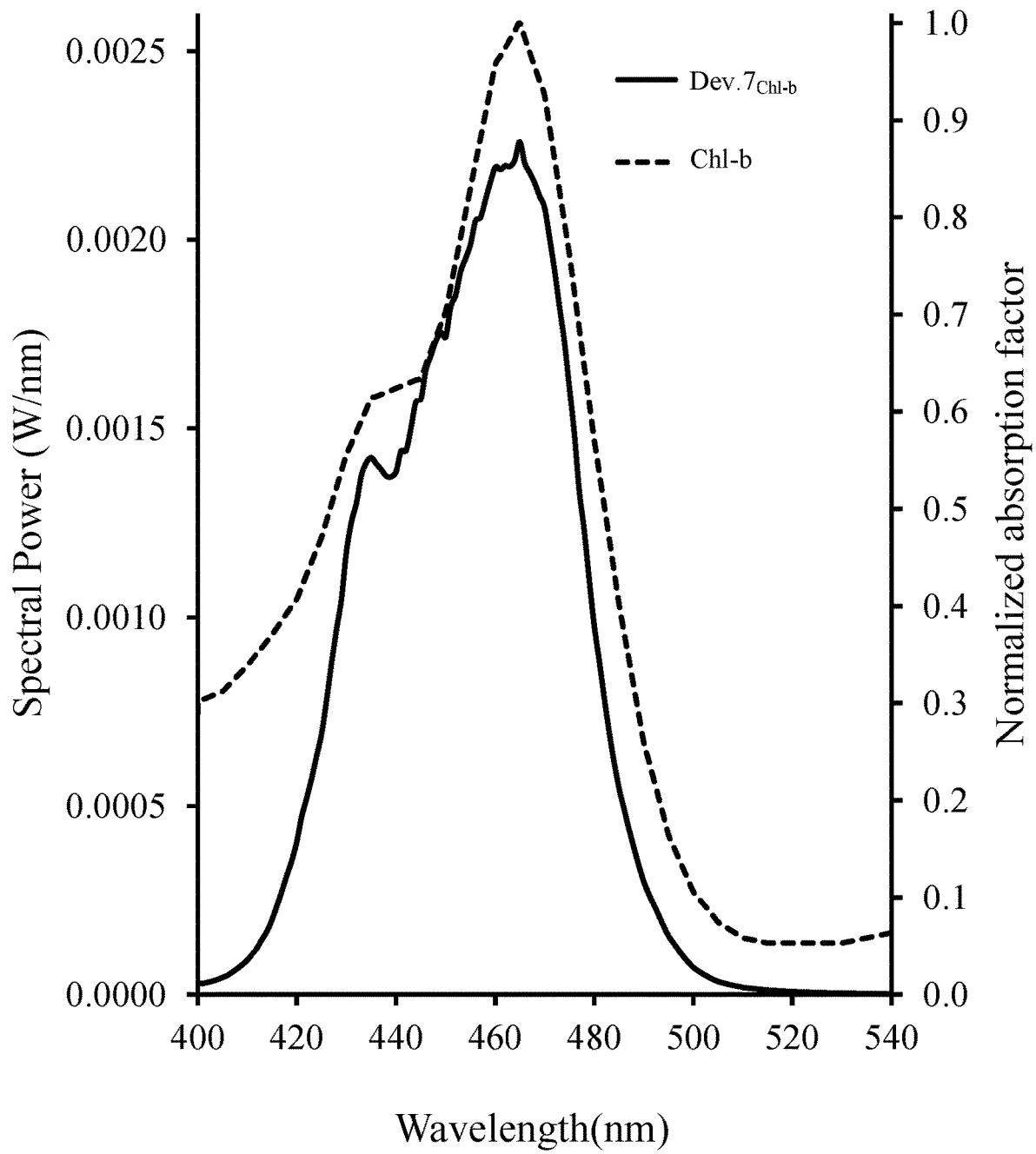
FIG. 12 shows normalized absorption spectrum, normalized absorption factor versus wavelength (nm), for chlorophyll-b (dashed line—Chl-b) and spectral power distribution, spectral power (W/nm) versus wavelength (nm), for light absorbed by chlorophyll-b (solid line—Dev. $7_{Chl-b}$)

FIG. 12 shows spectral power distribution (SPD), spectral power (W/nm) versus wavelength (nm), of light absorbed by chlorophyll-b (solid line—Dev. $7_{Chl-b}$). The SPD of light absorbed by chlorophyll-b (Dev. $7_{Chl-b}$) is derived by scaling spectral power values of the SPD of Dev. 6 by the normalized absorption spectrum of Chl-b. The normalized absorption spectrum of Chl-b is the absorption spectrum of Chl-b that has been normalized so that it has a maximum absorption value is equal to one. As a result to obtain absolute spectral power values absorbed by chlorophyll-b, the spectral power value should be scaled by 0.85. For comparison, FIG. 12 also includes the absorption spectrum, absorption factor versus wavelength for the chlorophyll-b pigment (dashed line—Chl-b).

The photosynthetic photon flux (PPF) generated by Dev. 7, $PPF_{Dev.7}$, is 0.6370 µmol/s and the photosynthetic photon efficacy (PPE) is 1.9076 µmol/J. The PPF absorbed by Chl-a, $PPF_{Chl-a}$, is 0.1790 µmol/s giving a photosynthesis factor ($PPF_{Chl-a}/PPF_{Dev.7}$) for Chl-a of 28%. The PPF absorbed by Chl-b, $PPF_{Chl-b}$, is 0.3391 µmol/s giving a photosynthesis factor ($PPF_{Chl-b}/PPF_{Dev.7}$) for Chl-b of 53%. The PPF absorbed by Caro, $PPF_{caro}$, is 0.2917 µmol/s giving a photosynthesis factor ($PPF_{caro}/PPF_{Dev.7}$) for Caro of 46%. In TABLE 6, the values in parenthesis are calculated using the normalized absorption spectrum.

TABLE 6

Optical characteristics of solid-state light source Dev.7 @ 85° C.

| $\lambda_{pe}$ (nm) | FWHM (nm) | PPF (μmol/s) | | | | Photosynthesis factor (%) | | | $PPE_{Dev.7}$ (μmol/J) |
|---|---|---|---|---|---|---|---|---|---|
| | | $PPF_{Dev.7}$ | $PPF_{Chl-a}$ | $PPF_{Chl-b}$ | $PPF_{Caro}$ | Chl-a | Chl-b | Caro | |
| 448 | 64 | 0.6370 | 0.1790 (0.2712) | 0.3391 (0.3989) | 0.2917 (0.4705) | 28 (43) | 53 (63) | 46 (74) | 1.9076 |

Purple Grow-Light: Broadband Full Spectrum Blue Solid-State Light Source

Dev. 8 is a purple light emitting device (grow-light) in accordance with the invention that utilizes a broadband full spectrum blue solid-state light source and is configured to promote photosynthesis involving the chlorophyll-a and chlorophyll-b pigments. The full spectrum solid-state light source comprises a combination of two InGaN/GaN MQW broadband blue LEDs. The first broadband LED generates blue light with a peak emission wavelength of 432 nm. The second broadband LED generates blue light with a peak emission wavelength of 451 nm. The peak emission wavelengths of the broadband blue LEDs are selected such that Dev. 8 has a peak emission wavelength lying between the peak absorption wavelengths of chlorophyll-a and chlorophyll-b (430 nm and 465 nm).

The purple light emitting device Dev. 8 comprises a 2835 SMD package containing the two broadband blue LEDs and a red photoluminescence material that generates light with a peak emission wavelength in the orange to red (from about 640 nm to about 675 nm) region of the spectrum corresponding to the red absorption peaks of chlorophyll-a and chlorophyll-b. More particularly, Dev. 8 comprises a Calcium Aluminum Silicon Nitride phosphor (CASN) of general formula $CaAlSiN_3:Eu^{2+}$ with a peak emission wavelength of 660 nm. The light emitting device Dev. 8 generates purple light comprising a combination of blue light generated by the solid-state light source and red photoluminescence light generated by the red phosphor.

Figure 13:
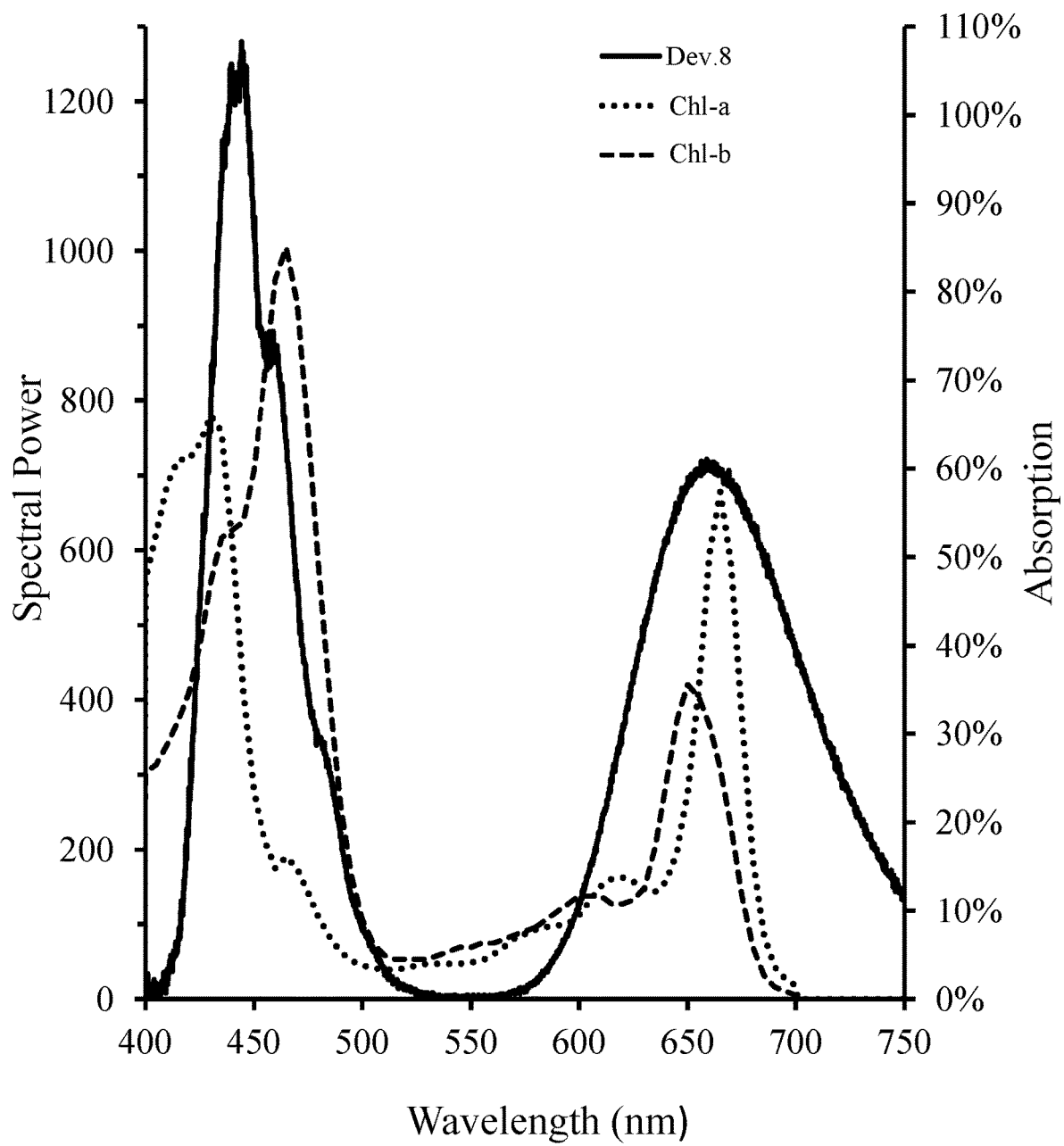
FIG. 13 shows absorption spectra, absorption (%) versus wavelength (nm), for photosynthetic pigments: (i) chlorophyll-a (dotted line—Chl-a), (ii) chlorophyll-b (dashed line—Chl-b), and spectral power distribution, spectral power versus wavelength (nm) for a purple light emitting device (grow-light) Dev. 8 (solid line Dev. 8) utilizing a broadband full spectrum blue solid-state light source.

FIG. 13 shows absorption spectra, absorption (%) versus wavelength (nm), for photosynthetic pigments: (i) chlorophyll-a (dotted line—Chl-a), (ii) chlorophyll-b (dashed line—Chl-b), and spectral power distribution, spectral power versus wavelength (nm) for the purple grow-light (light emitting device) Dev. 8 (solid line Dev. 8).

Figure 14:
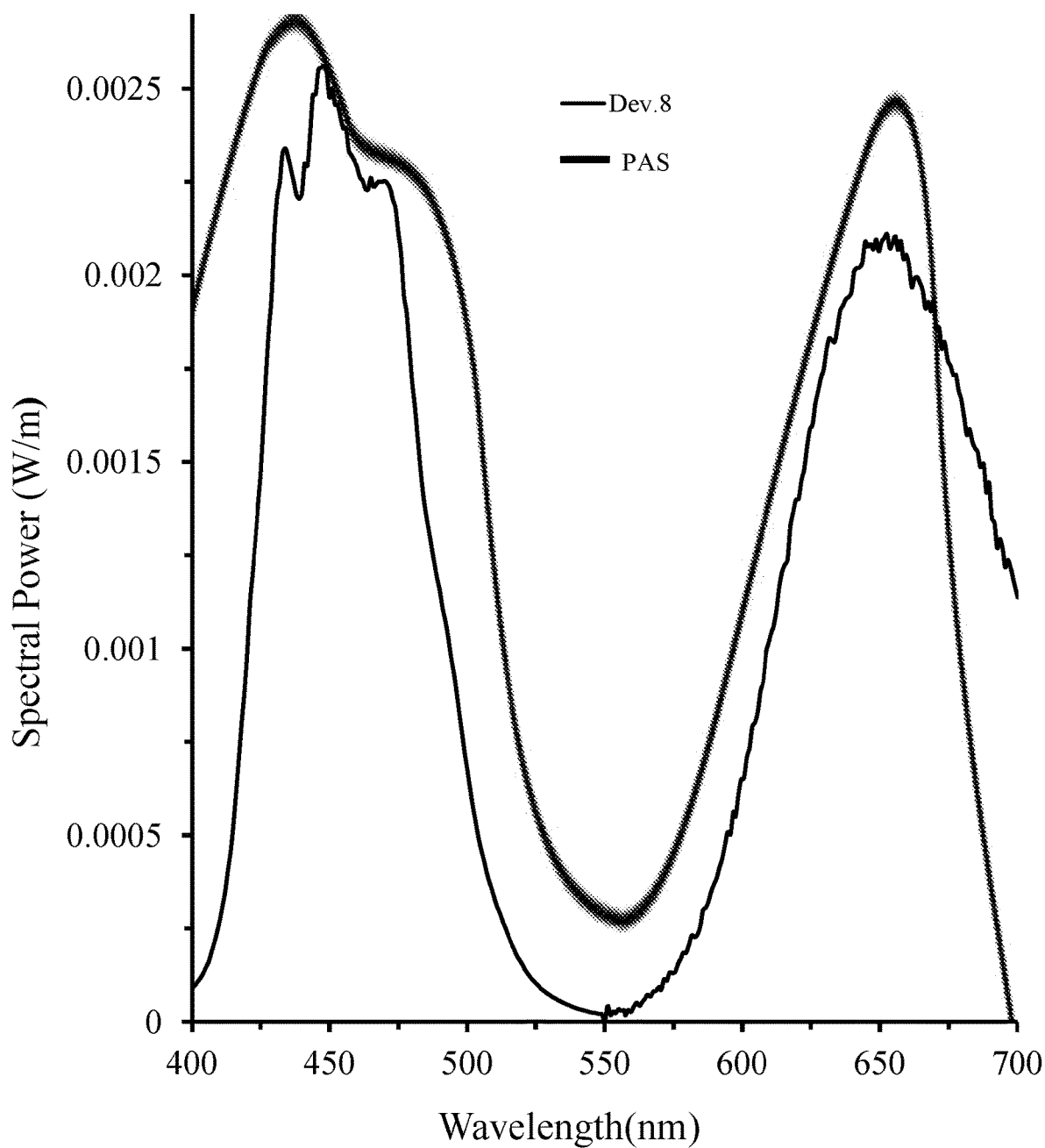
FIG. 14 shows spectral power distribution, spectral power versus wavelength (nm) for Dev. 8 (dotted line—Dev. 8) utilizing a broadband full spectrum blue solid-state light source, and PAS (thick solid line—PAS)

FIG. 14 shows spectral power distribution, spectral power versus wavelength (nm) for Dev. 8 (thin solid line—Dev. 8) and PAS (thick solid line—PAS). As can be seen from FIG. 14 light generated by Dev. 8 has a spectral composition whose shape substantially matches that of the PAS. Such a correspondence in spectral composition promotes photosynthesis as well as increase PPF efficacy of the device.

White Grow-Light: Broadband Full Spectrum Blue Solid-State Light Source

Dev. 9 is a white light emitting device (grow-light) in accordance with the invention that utilizes a broadband full spectrum blue solid-state light source and is configured to promote photosynthesis involving the chlorophyll and carotenoid pigments. The full spectrum solid-state light source comprises a combination of two InGaN/GaN MQW broadband LEDs. The first broadband LED generates blue light with a peak emission wavelength of 432 nm. The second broadband LED generates blue light with a peak emission wavelength of 451 nm.

The white light emitting device Dev. 9 comprises a 2835 SMD package containing the two broadband blue LEDs, a red photoluminescence material that generates light with a peak emission wavelength in orange to red (from about 640 nm to about 675 nm) region of the spectrum corresponding to the red absorption peak of chlorophyll-a, and a green to yellow photoluminescence material that generates light with a peak emission wavelength in the green to yellow (from about 540 nm to about 600 nm) region of the spectrum. More particularly, Dev. 9 comprises a Calcium Aluminum Silicon Nitride phosphor (CASN) of general formula $CaAlSiN_3:Eu^{2+}$ with a peak emission wavelength of 650 nm and a YAG based phosphor with a peak emission wavelength of 510 nm to 570 nm. The light emitting device Dev. 9 generates white light with a CCT of about 4000K that comprises a combination of broadband full spectrum blue light generated by the solid-state light source and green to red photoluminescence light generated by the photoluminescence materials. A combination of a Broadband blue with FWHM greater than about 30 nm with a cyan emitting phosphor with a peak emission wavelength from 510 nm to 530 nm are important for generating light that mimics (closely resembles) sunlight.

Figure 15:
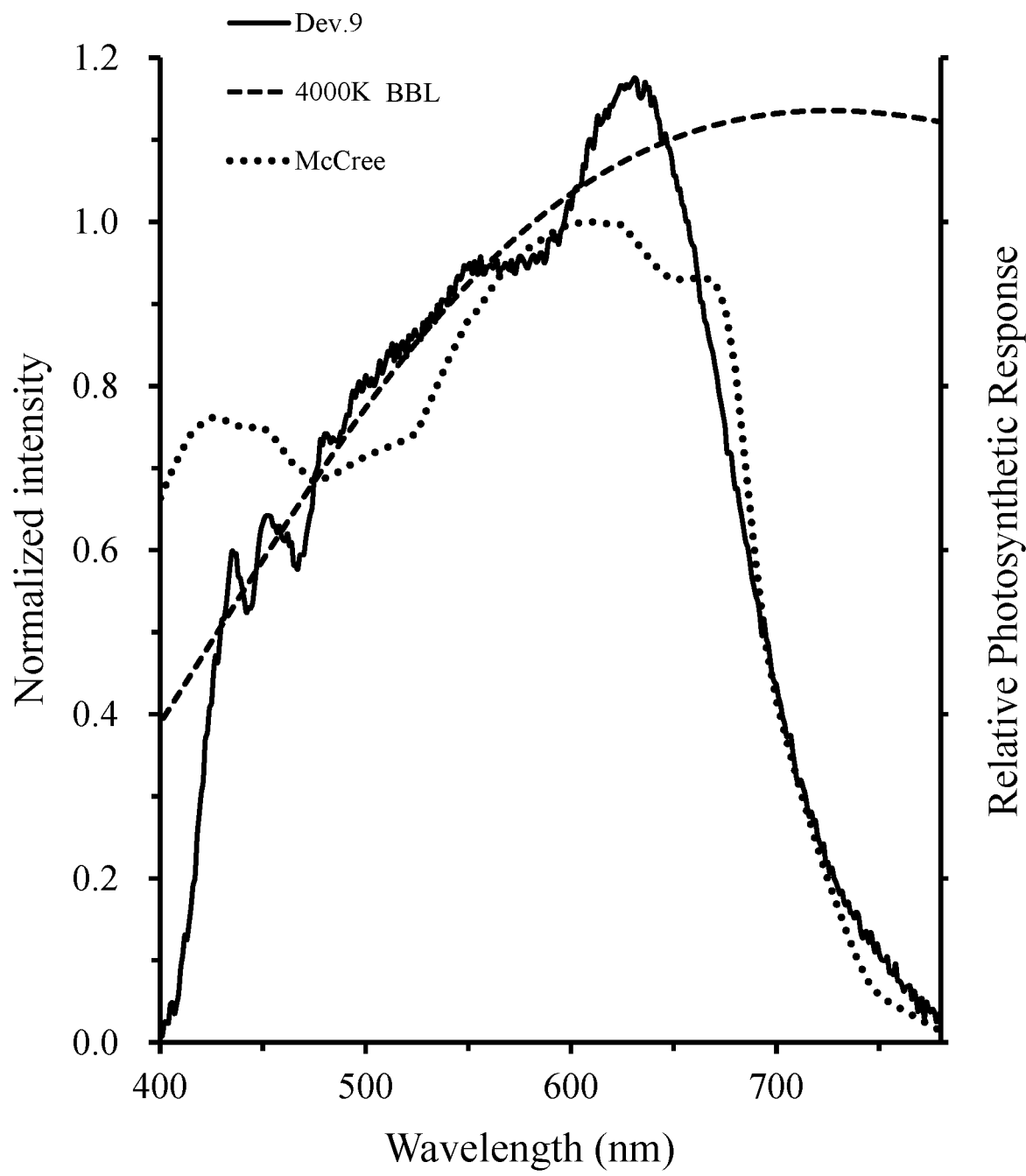
FIG. 15 shows emission spectrum, normalized intensity versus wavelength (nm), for a white light emitting device (grow-light) Dev. 9 (solid line Dev. 9) utilizing a full spectrum white solid-state light source, Plankian locus (black body locus—BBL), normalized intensity versus wavelength (nm), for a CCT of 4000K (dashed line—4000K BBL), and McCree Curve (dotted line—McCree)

FIG. 15 shows emission spectrum, normalized intensity versus wavelength (nm), for a white light emitting device (grow-light) Dev. 9 (solid line Dev. 9) utilizing a broadband full spectrum blue solid-state light source, Planckian locus (black body locus—BBL), normalized intensity versus wavelength (nm), for a CCT of 4000K (dashed line—4000K BBL), and McCree curve (dotted line—McCree). As can be seen from FIG. 15, white light generated by Dev. 9 has a spectral composition that substantially matches the Planckian locus of a black body radiator of 4000K for wavelength from about 420 nm to about 650 nm indicating that the light closely resembles that of daylight (4000K). Moreover, it can be seen that white light generated by Dev. 9 has a spectral composition whose shape closely matches that of the McCree Curve. Such a correspondence in spectral composition with the McCree Curve indicates that Dev. 9 may increase plant photosynthesis active yield.

In various embodiments of the present invention, in particular those utilizing broadband and broadband full spectrum blue solid state light sources, a grow-light (light emitting device) advantageously generates light who spectral composition matches (resembles) the PAS or McCree Curve in the blue region of the spectrum.

Figure 16:
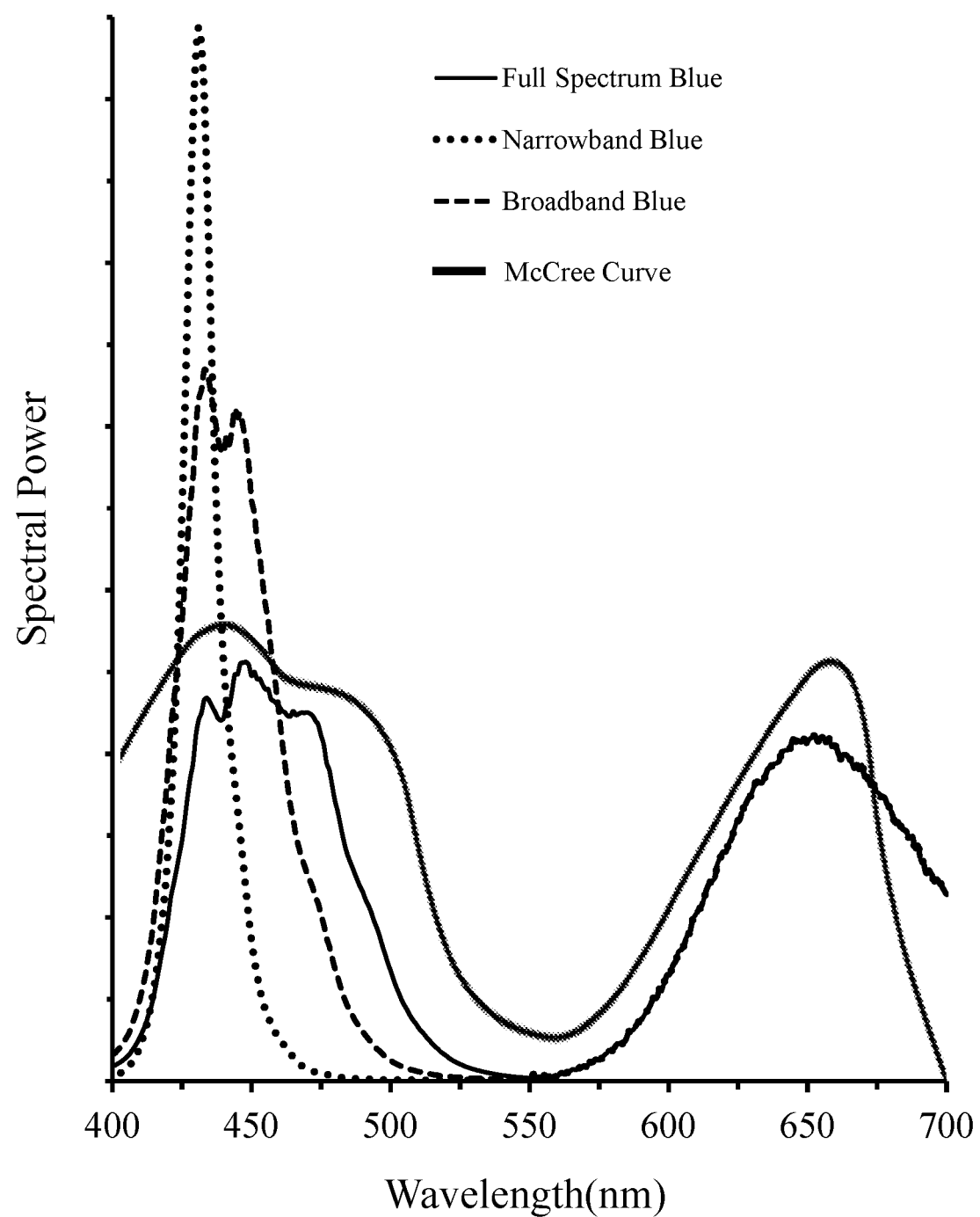
FIG. 16 shows spectral power distribution, spectral power versus wavelength (nm) for purple grow-lights utilizing: (i) a narrowband blue solid-state light source (dotted line—Narrowband Blue), (ii) a broadband blue solid-state light source (dashed line—Broadband Blue), and (iii) a broadband full spectrum blue solid-state light source (thin solid line—Full Spectrum Blue) and PAS (thick solid line—PAS)

As shown in FIGS. 14 and 16 when such a broadband full spectrum blue emission is used with a red phosphor emitting with a peak emission wavelength of about 660 nm, purple light generated by the grow-light closely matches the PAS. For comparison, FIG. 16 also includes shows spectral power distribution, spectral power versus wavelength (nm) for purple grow-lights utilizing: (i) a narrowband blue solid-state light source (dotted line—Narrowband Blue) and (ii) a broadband blue solid-state light source (dashed line—Broadband Blue). It is to be noted that each light source generates blue light with the same photon energy (area under the curve). As can be seen from FIG. 16, grow-lights utilizing both narrowband and broadband blue solid-state light sources have an emission spectrum with a peak that far exceeds the PAS. This is a result of their photon energy being distributed over a shorter range of wavelengths compared with broadband full spectrum source. As a result of the very broad emission spectrum of the broadband full spectrum, in which the photo energy is spread over a greater wavelength range, this leads to an increase in photosynthesis.

As shown in FIG. 16, when such a broadband full spectrum blue emission is used with broadband white conversion phosphor materials (cyan to red) emitting from about 500 nm to 660 nm white light generated by the grow-light substantially matches the McCree Curve.

Grow-Lights Comprising Broadband Blue Light Emitting Devices

In accordance with aspects of the invention, there are provided purple grow-lights, for example linear grow-lights, which can comprise a combination of one or more broadband blue light emitting devices according to the invention and one or more broadband red light emitting devices. In embodiments, the broadband blue light emitting devices and broadband red light emitting devices comprise package devices.

Figure 17A:
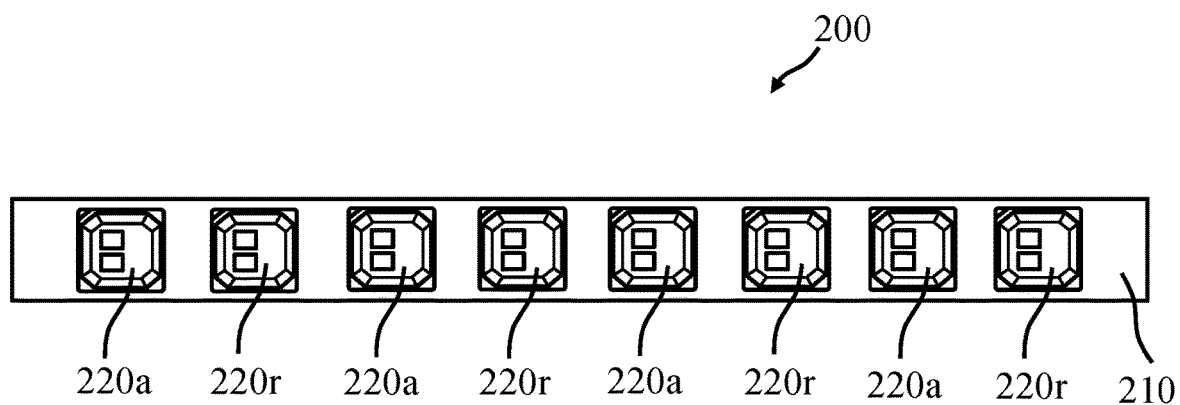
FIGS. 17A and 17B are schematic plan views of a grow-light according to the invention comprising broadband blue solid-state light sources.
Figure 17B:
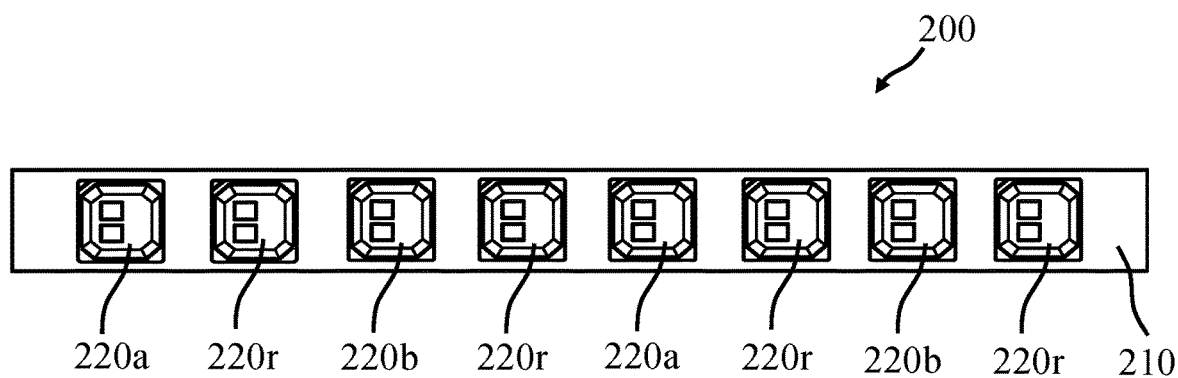

FIGS. 17A and 17B are schematic views of grow-lights 200, for example T8 linear lamps, according to the invention. Each grow-light 200 may comprise a linear (elongate strip) substrate 210, for example a metal core printed circuit board (MCPCB), having a plurality of packaged broadband light emitting devices 220 mounted along its length. As illustrated the light emitting devices 220 can be arranged as a linear array extending in the direction of elongation of the substrate.

The light emitting devices 220 may comprise: (i) a broadband blue light emitting device (Blue Chl-a LED) 220a with a peak emission wavelength (e.g. about 420 nm to 450 nm) substantially matching the chlorophyll-a (Chl-a) absorption peak, (ii) a broadband blue light emitting device (Blue Chl-b LED) 220b with a peak emission wavelength (e.g. about 460 nm to 470 nm) substantially matching the chlorophyll-b (Chl-b) absorption peak, or (iii) a broadband red light emitting device (Red Chl LED) 220r with a peak emission wavelength (e.g. about 640 nm to about 675 nm) substantially matching the chlorophyll-a (Chl-a) and chlorophyll-b (Chl-b) absorption peaks in the red region of the spectrum.

The Blue Chl-a LED 220a and Blue Chl-b LED 220b may comprise, for example, the packaged light emitting device 100 of FIGS. 2A and 2B comprising two MQW broadband LED chips 118. The peak emission wavelengths of the MQW broadband LED chips 118 can be the same or may be different.

The Red LED 220r may comprise, for example, a packaged Phosphor Converted Red LED (PC Red LED) that is based on packaged light emitting device 100 of FIGS. 2A and 2B. For a red light emitting device 220r, the packaged light emitting device 100 typically comprises two narrowband blue LED chips 118 and the cavity 116 of the package 112 is filled with a light transmissive medium 122 that incorporates a red photoluminescence material. The red photoluminescence material generates light with a peak emission wavelength in the orange to red (from about 640 nm to about 675 nm) region of the spectrum corresponding to the red absorption peaks of chlorophyll-a and chlorophyll-b (i.e. 10b and 20b of FIG. 1A). In embodiments, the red photoluminescence material may comprise a Calcium Aluminum Silicon Nitride phosphor (CASN) of general formula $CaAlSiN_3$:$Eu^{2+}$ with a peak emission wavelength of about 660 nm.

The Photosynthetic Photon Flux (PPF) for the Blue Chl-a LEDs, Blue Chl-b LEDs, and Red Chl LEDs may be substantially the same, that is each source generates substantially the same the total number of photons (photon count) per second (photon flux).

The inventors have determined that grow-lamps can be provided that are optimized to a given for application by appropriate selection of the ratio of Blue Chl LEDs (Chl-a+Chl-b) to Red Chl LEDs, more specifically the ratio of Blue photon count (i.e. Blue photon flux $PF_{Blue}$ for wavelengths in the blue region of the spectrum) to Red photon count (i.e. Red photon flux for wavelengths in the red region of the spectrum). Moreover, grow-lamps can be optimized to a given for application by appropriate selection of the ratio of Blue Chl-a LEDs to Blue Chl-b LEDs, more specifically the ratio of Blue Chl-a photon count (i.e. Blue photon flux for wavelengths in the blue region of the spectrum corresponding to the Chl-a blue absorption peak) to Blue Chl-b photon count (i.e. Blue photon flux for wavelengths in the blue region of the spectrum corresponding to the Chl-b blue absorption peak). In this way, grow-lamps can be provided that are optimized to a given for application such as promoting photosynthesis or sole-source lighting for promoting photosynthesis or for promoting plant propagation or promoting flowering.

The grow-lamp 200 of FIG. 17A comprises a plurality of Blue Chl-a LEDs 220a and Red Chl LEDs 220r. As illustrated, the ratio of the number of Blue Chl-a LEDs 220a to the number of Red Chl LEDs 220r is 1:1. In the case where there are equal numbers of Blue Chl-a and RED Chl LEDs and each LED emits substantially the same total number of photons per second (i.e. they have substantially the same photon flux), the spectral composition of light generated by the grow-light will have a ratio of blue photon count (Blue photon flux $PF_{Blue}$) to red photon count (Red photon flux $PF_{Red}$) which is about 1:1 (1.0±0.3:1.0, i.e. ratios from 0.7:1 to 1.3:1). The inventors have determined that a grow-light having a spectrum comprising substantially an equal photon count (photon flux) of Blue Chl-a and Red Chl photons can promote photosynthesis. It will be appreciated that in other arrangements different ratios of Blue Chl-a photons to RED Chl photons may be used.

Referring to FIG. 17B, the grow-lamp 200 comprises a plurality of Blue Chl-a LEDs 220a, Blue Chl-b LEDs 220b, and Red Chl LEDs 220r. As illustrated, the ratio of the combined number of Blue Chl-a LEDs and Chl-b LEDs 220a, 220b to the number of Red Chl LEDs 220r is 1:1. In the case each LED emits substantially the same total number of photons per second (i.e. they have substantially the same photon flux), the spectral composition of light generated by the grow-light will have a ratio of blue photon count (Blue photon flux $PF_{Blue}$) to red photon count (Red photon flux $PF_{Re}d$) which is about 1:1 (1.0±0.3:1.0, i.e. ratios from 0.7:1 to 1.3:1). The inventors have determined that a grow-light having a spectrum comprising a substantially equal photon count (Blue photon flux $PF_{Blue}$) of Blue Chl-a+Blue Chl-b photons (Blue photon flux $PF_{Blue}$) and Red Chl photons (Red photon flux $PF_{Re}d$) can promote photosynthesis.

In other arrangements the Blue photon count (Blue photon flux $PF_{Blue}$) can be greater than the Red photon count (Red photon flux $PF_{Re}d$), for example a ratio of about 3:1 (3.0±0.5:1.0, i.e. ratios from 2.5:1 to 3.5:1). The inventors have determined that a grow-light having a spectrum comprising a greater blue photon count (Blue photon flux $PF_{Blue}$)

of Blue Chl-a+Blue Chl-b photons (Blue photon flux $PF_{Blue}$) than Red photon count (Red photon flux $PF_{Re}d$) can promote propagation.

In yet further arrangements, the Red photon count (Red photon flux $PF_{Re}d$) can be greater than Blue photon count (Blue photon flux $PF_{Blue}$), for example a ratio of about 3:1 (3.0±0.5:1.0, i.e. ratios from 2.5:1 to 3.5:1). The inventors have determined that a grow-light having a spectrum comprising a greater red photon count (Red photon flux $PF_{Red}$) than Blue photon count (Red photon flux $PF_{Re}d$) can promote flowering.

Moreover, in arrangements that utilize both Blue Chl-a LEDs and Blue Chl-b LEDs, the Blue Chl-a photon count (Blue photon flux $PF_{Blue-Chl-a}$) can be greater than the Blue Chl-b photon count (Blue photon flux $PF_{Blue-Chl-b}$), for example a ratio of about 3:1 (3.0±1.0:1.0, i.e. ratios from 2:1 to 4:1), that is about 75% of the blue light is generated by the Blue Chl-a LEDs.

Photon flux ratios for different grow-light application are tabulated in TABLE 7.

TABLE 7

Photon count (flux) ratios for different applications

| Grow-light application | $PF_{Blue}:PF_{Red}$ | $PF_{Blue-Chla}:PF_{Blue-Chlb}$ |
|---|---|---|
| Photosynthesis | 1:1 (1.0 ± 0.3:1.0) | 1:0 |
| Photosynthesis (sole-source lighting) | 1:1 (1.0 ± 0.3:1.0) | 3:1 (3.0 ± 1.0:1.0) |
| Propagation | 3:1 (3.0 ± 0.5:1.0) | 3:1 (3.0 ± 1.0:1.0) |
| Flowering | 1:3 (1.0:3.0 ± 0.5) | 3:1 (3.0 ± 1.0:1.0) |

Dev. 10 is a solid-state blue light source (Blue Chl-a LED) comprising a SMD 2835 packaged broadband blue light emitting device in accordance with the invention that comprises two broadband MQW LEDs with a peak emission wavelength corresponding to the chlorophyll-a (Chl-a) absorption peak.

Dev. 11 is a solid-state blue light source (Blue Chl-b LED) comprising a SMD 2835 packaged broadband blue light emitting device in accordance with the invention that comprises two broadband MQW LEDs with a peak emission wavelength corresponding to the chlorophyll-b (Chl-b) absorption peak.

Dev. 12 is a solid-state red light source (Red Chl LED) comprising a SMD 2835 packaged PC Red LED (Red Chl LED) with a peak emission wavelength (about 660 nm) corresponding to the chlorophyll-a (Chl-a) and chlorophyll-b (Chl-b) absorption peaks in the red region of the spectrum.

Each of devices Dev. 10 to Dev. 12 are 0.2 W devices with a 3V forward drive voltage.

Figure 18:
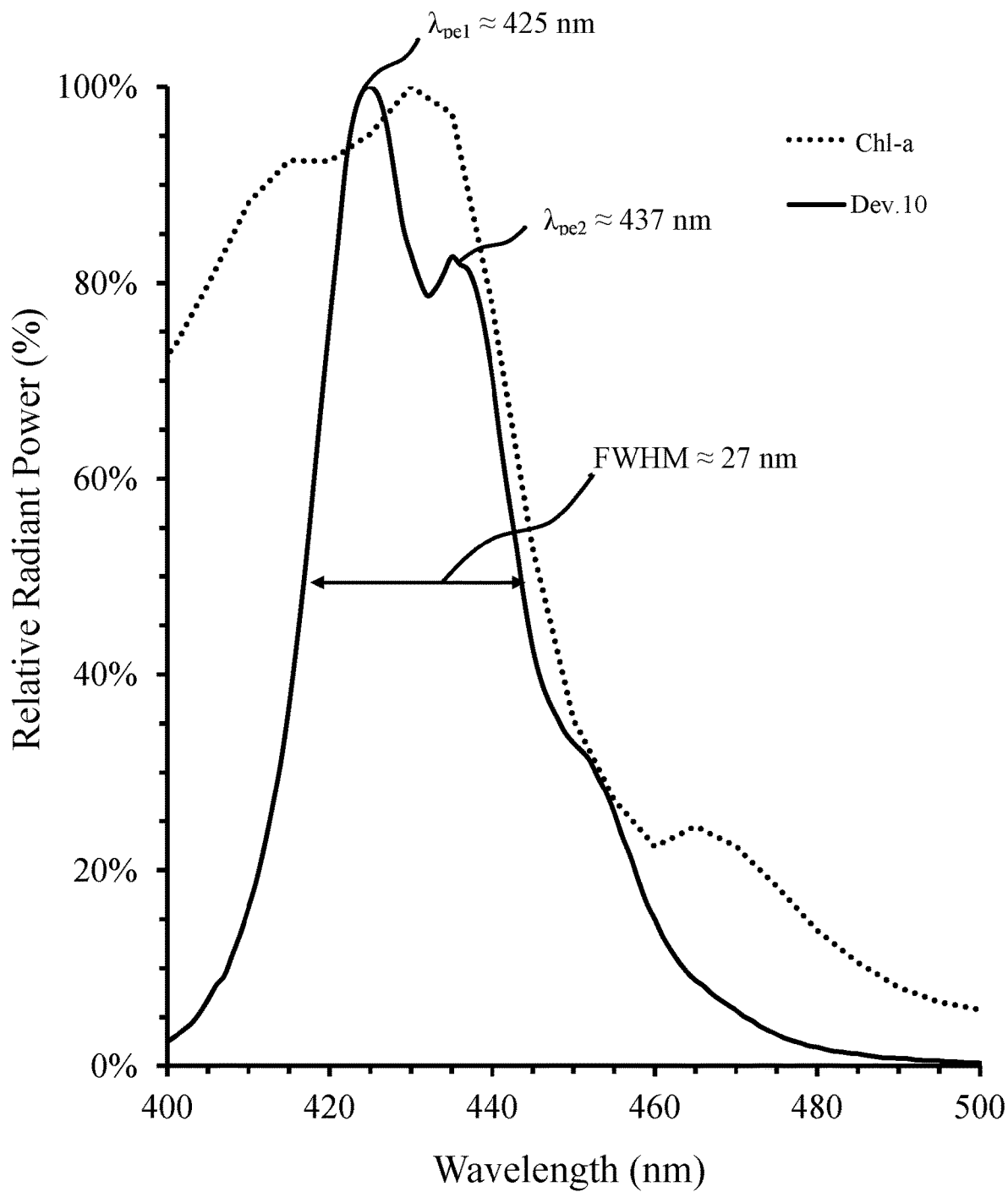
FIG. 18 shows radiant power spectrum, relative radiant power versus wavelength (nm), for a broadband blue solid-state light source Dev. 10 (solid line—Dev. 10) and absorption spectra, absorption versus wavelength (nm) for chlorophyll-a (dotted line—Chl-a)
Figure 19:
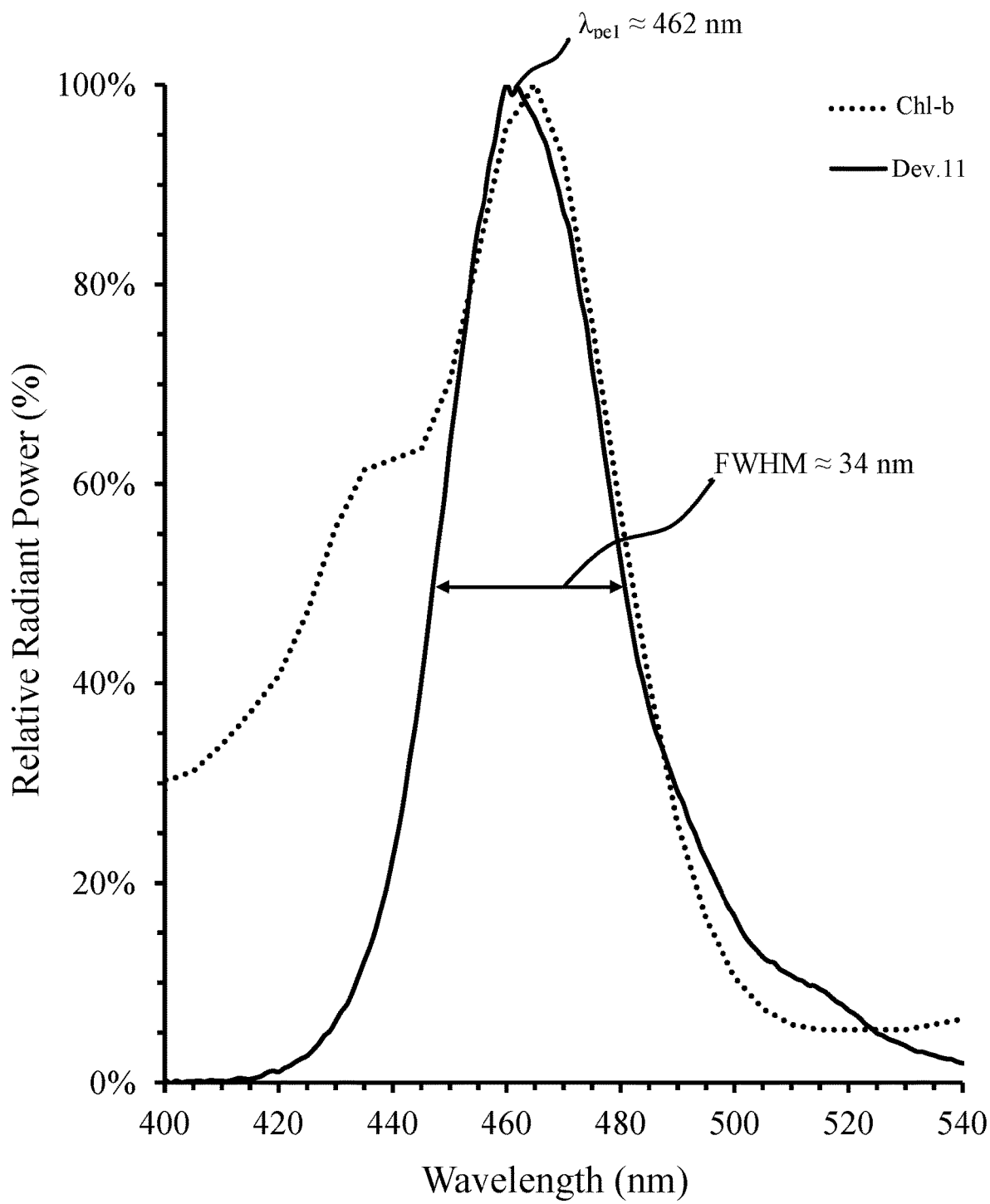
FIG. 19 shows radiant power spectrum, relative radiant power versus wavelength (nm), for a broadband blue solid-state light source Dev. 11 (solid line—Dev. 11) and absorption spectra, absorption versus wavelength (nm) for chlorophyll-b (dotted line—Chl-b)
Figure 20:
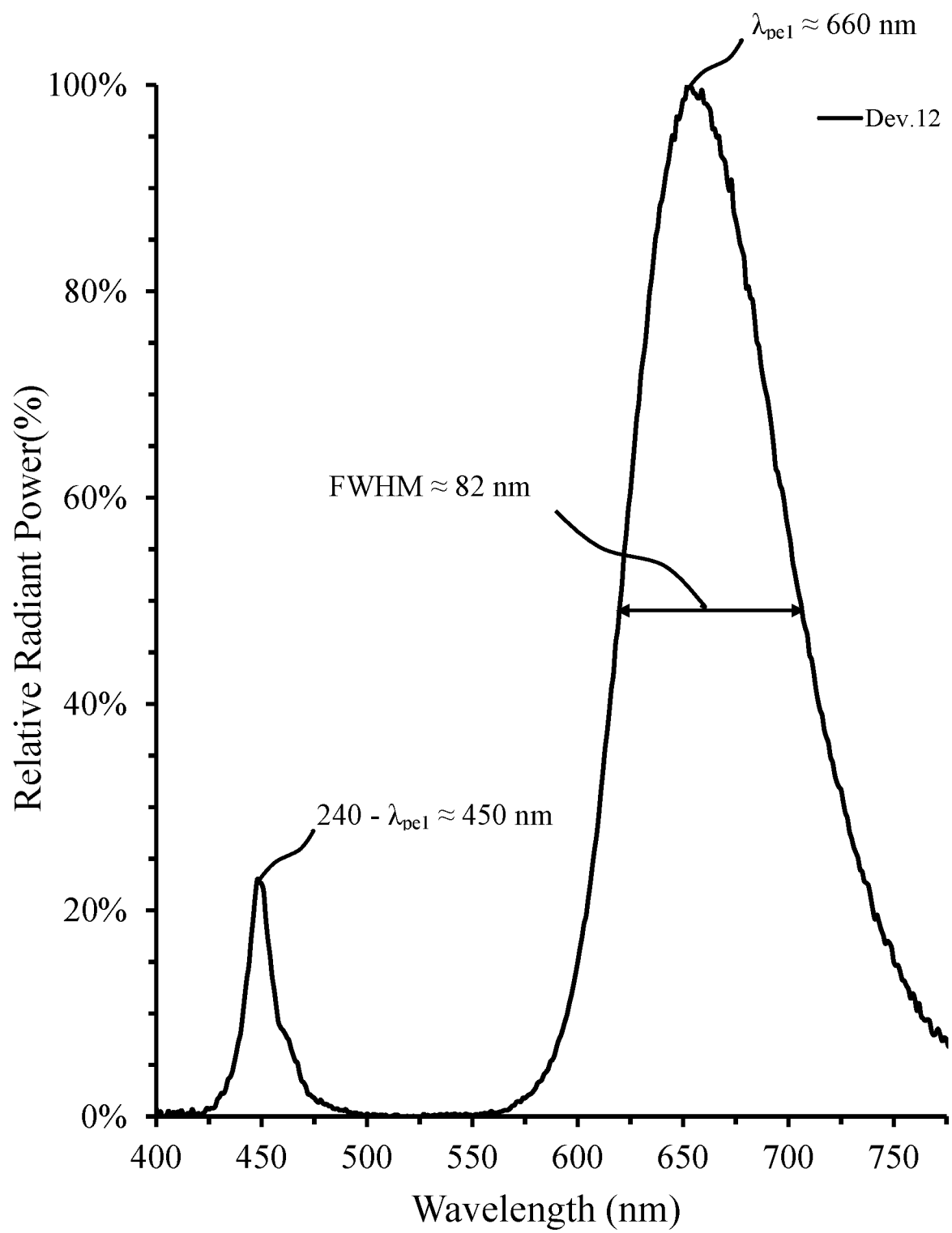
FIG. 20 shows radiant power spectrum, relative radiant power versus wavelength (nm), for a broadband red solid-state light source Dev. 12 (solid line—Dev. 12)

TABLE 8 tabulates the measured optical characteristics of packaged light emitting devices Dev. 10 to Dev. 12. FIG. 18 shows radiant power spectrum, relative radiant power versus wavelength (nm), for the broadband blue solid-state light source (Blue Chl-a LED) Dev. 10 (solid line—Dev. 10) and absorption spectra, absorption versus wavelength (nm) for chlorophyll-a (dotted line—Chl-a). FIG. 19 shows radiant power spectrum, relative radiant power versus wavelength (nm), for the broadband blue solid-state light source (Blue Chl-a LED) Dev. 11 (solid line—Dev. 11) and absorption spectra, absorption versus wavelength (nm) for chlorophyll-b (dotted line—Chl-b). FIG. 20 shows radiant power spectrum, relative radiant power versus wavelength (nm), for a broadband red solid-state light source (Red Chl LED) Dev. 12 (solid line—Dev. 12).

As can be seen from TABLE 8, each of devices Dev. 10 to Dev. 12 have substantially the same PPF and PPE. Referring to FIG. 18, it is to be noted that Dev. 10 (Blue Chl-a LED) has an emission spectrum that substantially matches that of Chl-a with a first peak emission wavelength $\lambda_{pe}$ of about 426 nm and second peak emission wavelength $\lambda_{pe}$ of about 437 nm and a FWHM of about 27 nm. Referring to FIG. 19, it is to be noted that Dev. 11 (Blue Chl-b LED) has an emission spectrum that substantially matches that of Chl-b with a peak emission wavelength $\lambda_{pe}$ of about 462 nm and a FWHM of about 34 nm.

Referring to FIG. 20, it is to be noted that Dev. 12 (Red Chl LED) has an emission spectrum with a red peak emission wavelength $\lambda_{pe}$ of about 660 nm and a FWHM of about 82 nm. It should also be noted that there is a lower intensity peak 240 in the blue region of the spectrum with a peak emission wavelength $\lambda_{pe}$ of about 450 nm. The blue peak 240 corresponds to unconverted narrowband blue excitation light. A benefit of not converting all of the excitation light is that can optimize the Quantum Efficiency (QE) and PPE of the device.

TABLE 8

Measured optical characteristics of solid-state light source Dev.10 (Blue Chl-a), Dev.11 (Blue Chl-b), and Dev.12 (Red Chl) @ 85° C.

| Device | $\lambda_{pe1}$ (nm) | $\lambda_{pe2}$ (nm) | FWHM (nm) | PPF (μmol/s) | PPE (μmol/J) |
|---|---|---|---|---|---|
| Dev.10[1] | 425 | 437 | 27 | 0.41 | 2.21 |
| Dev.11[1] | 462 | — | 34 | 0.43 | 2.52 |
| Dev.12[2] | 660 | — | 82 | 0.42 | 2.41 |

[1]PPF and PPE includes wavelengths 400 nm to 700 nm
[2]PPF and PPE includes wavelengths 400 nm to 780 nm Solid-state grow-lights, Devs. 13 to 15, each comprise a T8 solid-state grow-light comprising a total of one hundred and eight broadband light sources (Blue Chl-a-Dev. 10, Blue Chl-b-Dev. 11, Red Chl-Dev. 12). Dev. 13 is configured to promote photosynthesis, Dev. 14 is configured to promote photosynthesis by sole-source lighting, and Dev. 15 is configured to promote flowering.

The composition of solid-state grow-lights, Devs. 13 to 15 are given in TABLE 9. As can be seen from TABLE 9, Dev. 13 comprises fifty four broadband Blue Chl-a LEDs and fifty four broadband Red Chl LEDs. Assuming that the Blue Chl-a LEDs and Red Chl LEDs each emit substantially the same number of photons per second, then the photon count of Blue chl-a to Red is 1:1.

As can be seen from TABLE 9, Dev. 14 comprises forty eight broadband Blue Chl-a LEDs, eight broadband Blue Chl-b LEDs and fifty two broadband Red Chl LEDs. In this arrangement, the ratio of blue photon count (Chl-a+Chl-b) to red photon count is 1:1. In terms of the composition of blue light, the ratio of Blue Chl-a to Blue Chl-b photon count is about 6:1 (48:8).

As can be seen from TABLE 9, Dev. 15 comprises seventeen broadband Blue Chl-a LEDs, two broadband Blue Chl-b LEDs and eighty nine broadband Red Chl LEDs. In this arrangement, the ratio of blue photon count (Chl-a+Chl-b) to red photon count is about 1:4 (13:55), that is the spectral composition of light generated by Dev. 15, has in terms of photon count, a predominance of red light. In terms of the composition of blue light, the ratio of Blue Chl-a to Blue Chl-b photon count is about 8:1 (17:2).

TABLE 9

Composition of solid-state grow-lights Dev. 13 to Dev. 16

| Grow-light (application) | No. of broadband light sources | | | | Ratio of light sources | |
|---|---|---|---|---|---|---|
| | Blue Chl-a (Dev. 10) | Blue Chl-b (Dev. 11) | Red Chl (Dev. 13) | Total | Chl-a:Chl-b:Red | Blue:Red |
| Dev. 13 (Photosynthesis) | 54 | — | 54 | 108 | 1:0:1 | 1:1 |
| Dev. 14 (sole-source) | 48 | 8 | 52 | 108 | 11:2:13 | 1:1 |
| Dev. 15 (Flowering) | 17 | 2 | 89 | 108 | 11:2:55 | 1:3 |

Note:
Each broadband light source has substantially the same photon count

TABLE 10A and 10B tabulates measured optical characteristics of grow-lights Dev. 13 to Dev. 15. In TABLE 10A: $PPF_{x-y}$ is the Photosynthetic photon flux for wavelengths from x-y nm; $PPE_{x-y}$ is Photon flux Efficacy for wavelengths from x-y nm; and $PF_{x-y}$ is the Photon flux (photon count per second) for wavelengths from x-y nm. In TABLE 10B: $PPF_{Blue}$ is the Photosynthetic photon flux for blue wavelengths from 400-500 nm; $PF_{Blue}$ is the Photon flux (photon count per second) for blue wavelengths from 400-500 nm; $PPF_{Red}$ is the Photosynthetic photon flux for red wavelengths from 600-700 nm; and $PF_{Red}$ is the Photon flux (photon count per second) for blue wavelengths from 600-700 nm.

Figure 21:
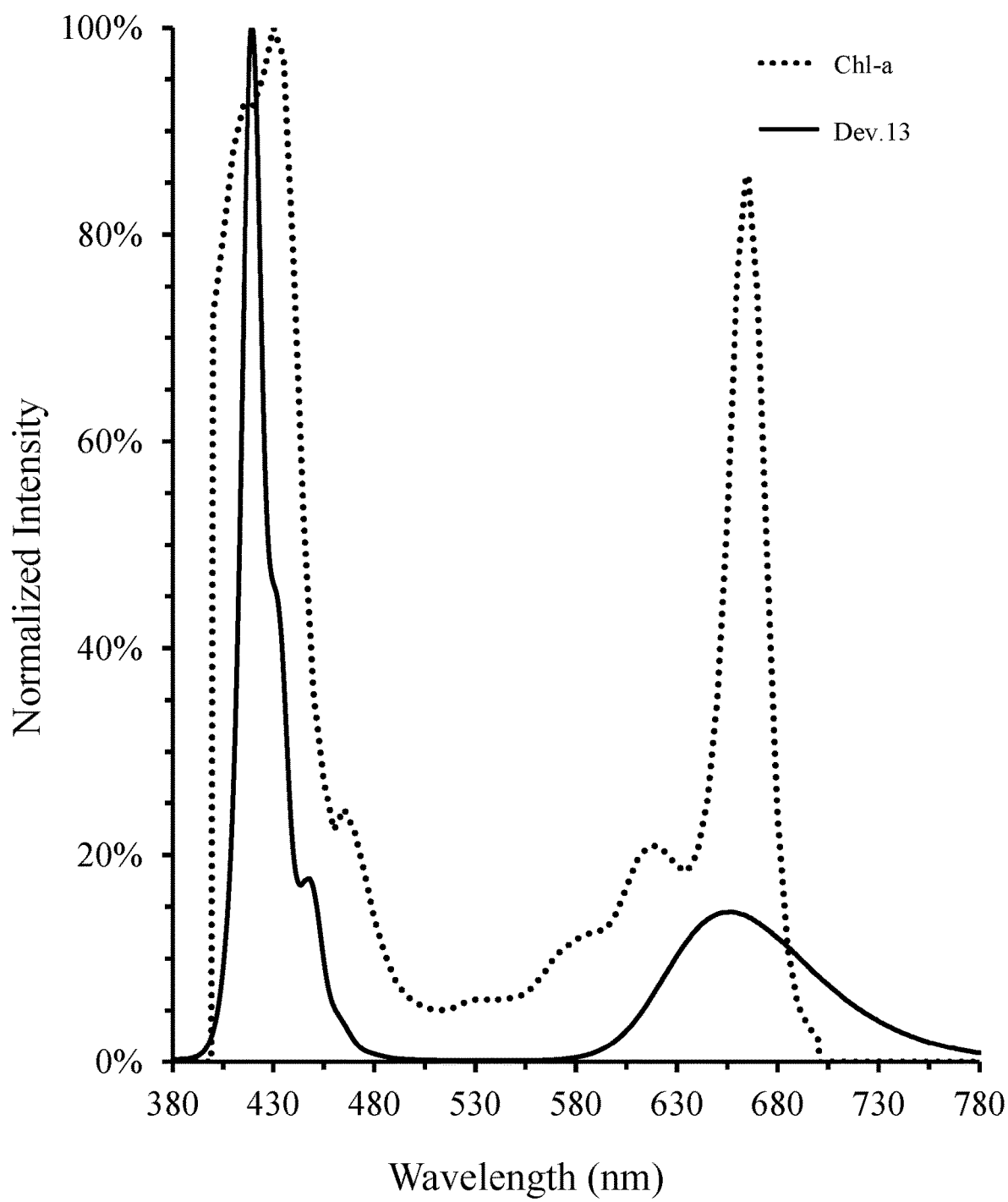
FIG. 21 shows emission spectrum, normalized intensity versus wavelength (nm), for a grow-light Dev. 13 (solid line—Dev. 13) and absorption spectra, normalized absorption versus wavelength (nm) for chlorophyll-a (dotted line—Chl-a)
Figure 22:
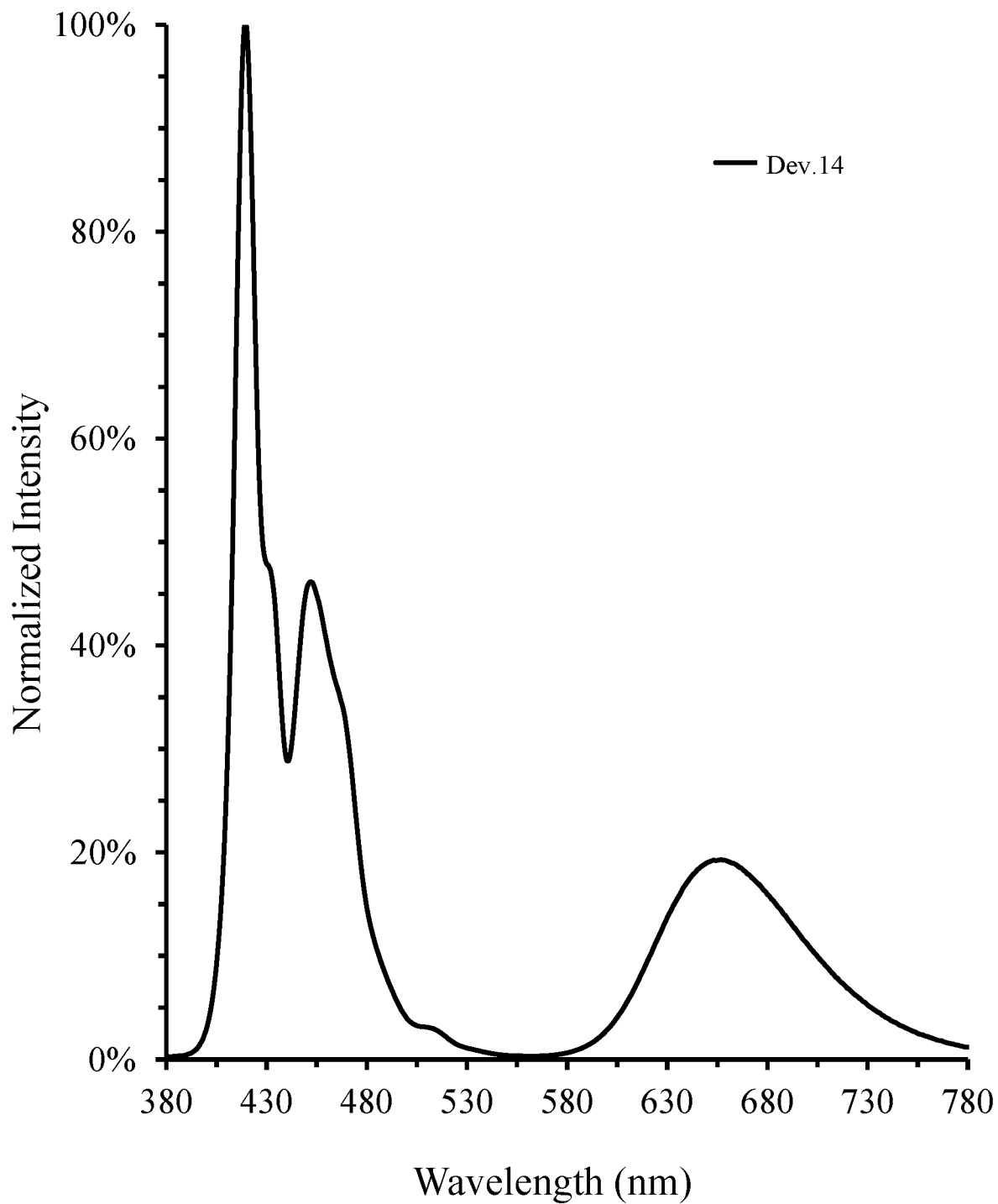
FIG. 22 shows emission spectrum, normalized intensity versus wavelength (nm), for a grow-light Dev. 14 (solid line—Dev. 14)
Figure 23:
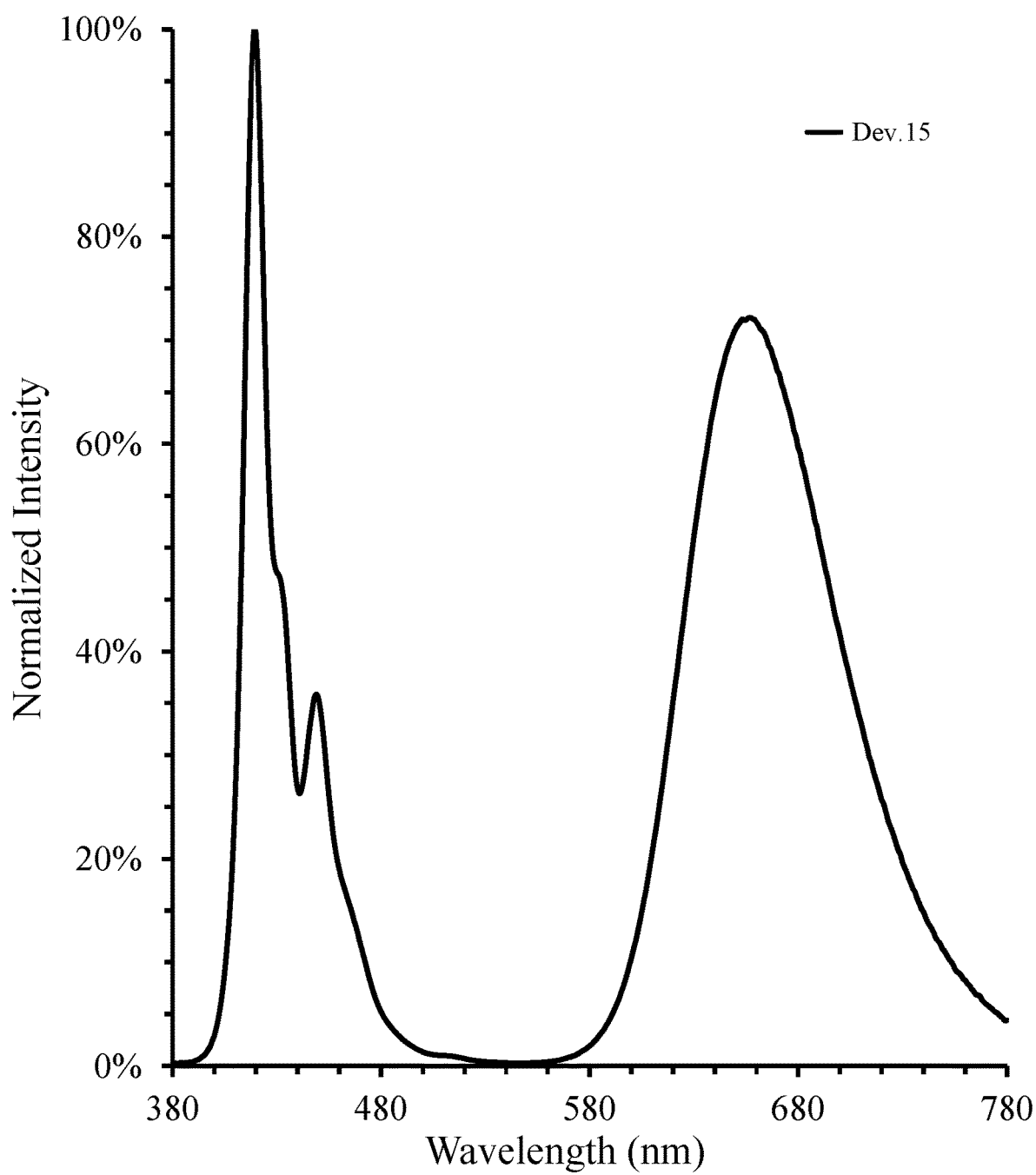
FIG. 23 shows emission spectrum, normalized intensity versus wavelength (nm), for a grow-light Dev. 15 (solid line—Dev. 15).

FIG. 21 shows emission spectrum, normalized intensity versus wavelength (nm), for a grow-light Dev. 13 (solid line—Dev. 13) and absorption spectra, normalized absorption versus wavelength (nm) for chlorophyll-a (dotted line—Chl-a). FIG. 22 shows emission spectrum, normalized intensity versus wavelength (nm), for a grow-light Dev. 14 (solid line—Dev. 14). FIG. 23 shows emission spectrum, normalized intensity versus wavelength (nm), for a grow-light Dev. 15 (solid line—Dev. 15).

TABLE 10A

Measured optical characteristics of solid-state grow-lights Dev. 13 to Dev. 16

| | Wavelength range | | | | | |
|---|---|---|---|---|---|---|
| | 400-700 nm | | | 380-780 nm | | |
| Grow-light | $PPF_{400-700}$[1] (µmol/s) | $PPE_{400-700}$[2] (µmol/J) | $PF_{400-700}$[3] (photon count/s) | $PPF_{380-780}$[1] (µmol/s) | $PPE_{380-780}$[2] (µmol/J) | $PF_{380-780}$[3] (photon count/s) |
| Dev. 13 | 42.148 | 1.7836 | $2.54 \times 10^{28}$ | 48.049 | 2.0334 | $2.90 \times 10^{28}$ |
| Dev. 14 | 42.850 | 1.8063 | $2.58 \times 10^{28}$ | 48.730 | 2.0541 | $2.94 \times 10^{28}$ |
| Dev. 15 | 39.758 | 1.7352 | $2.39 \times 10^{28}$ | 48.769 | 2.1285 | $2.94 \times 10^{28}$ |

[1] $PPF_{x-y}$ = Photosynthetic photon flux for wavelengths from x-y nm

[2] $PEE_{x-y}$ = Photon flux Efficacy for wavelengths from x-y nm

[3] $PF_{x-y}$ = Photon flux (photon count per second) for wavelengths from x-y nm

TABLE 10B

Measured optical characteristics of solid-state grow-lights Dev.13 to Dev.16

| Grow-light | Wavelength range | | | | Ratio $PF_{Blue}:PF_{Red}$ |
|---|---|---|---|---|---|
| | 400-500 nm (Blue) | | 600-700 nm (Red) | | |
| | $PPF_{Blue}$[1] (µmol/s) | $PF_{Blue}$[2] (photon count/s) | $PPF_{Red}$[3] (µmol/s) | $PF_{Red}$[4] (photon count/s) | |
| Dev.13 | 23.362 | $1.41 \times 10^{28}$ | 18.218 | $1.10 \times 10^{28}$ | 1.28:1 |
| Dev.14 | 23.657 | $1.43 \times 10^{28}$ | 18.321 | $1.10 \times 10^{28}$ | 1.29:1 |
| Dev.15 | 9.663 | $5.83 \times 10^{27}$ | 29.215 | $1.76 \times 10^{28}$ | 1:3 |

[1] $PPF_{Blue}$ = Photosynthetic photon flux for wavelengths from 400-500 nm
[2] $PF_{Blue}$ = Photon flux (photon count per second) for wavelengths from 400-500 nm
[3] $PPF_{Red}$ = Photosynthetic photon flux for wavelengths from 600-700 nm
[4] $PF_{Red}$ = Photon flux (photon count per second) for wavelengths from 600-700 nm As can be seen from TABLE 10A, grow-light Dev. 13 has a photosynthetic photon flux ($PPF_{400-700}$) of 42.148 µmol/s and a photosynthetic photon efficacy ($PPE_{400-700}$) of 1.7836 µmol/J. As can be seen from TABLE 10B, the ratio of the photon flux (photon count per second) in the blue region ($PF_{Blue}$) to the photon flux (photon count per second) in the red region ($PF_{Red}$) is about 1.3:1 (1.28:1).

As can be seen from TABLE 10A, grow-light Dev. 14 has a photosynthetic photon flux ($PPF_{400-700}$) of 42.850 µmol/s and a photosynthetic photon efficacy ($PPE_{400-700}$) of 1.8063 µmol/J. As can be seen from TABLE 10B, the ratio of the photon flux (photon count per second) in the blue region ($PF_{Blue}$) to the photon flux (photon count per second) in the red region ($PF_{Re}d$) is about 1.3:1 (1.29:1).

As can be seen from TABLE 10A, grow-light Dev. 15 has a photosynthetic photon flux ($PPF_{400-700}$) of 39.758 µmol/s and a photosynthetic photon efficacy ($PPE_{400-700}$) of 1.7352 µmol/J. As can be seen from TABLE 10B, the ratio of the photon flux (photon count per second) in the blue region ($PF_{Blue}$) to the photon flux (photon count per second) in the red region ($PF_{Re}d$) is about 1:3.

While the foregoing purple grow-lights have been described as utilizing a combination of one or more broadband blue light emitting devices and one or more broadband red light emitting device according to embodiments of the invention, it will be understood that the invention also encompasses grow-lights comprising a combination of one or more narrowband blue and one or more narrowband/broadband red light emitting devices; and grow-lights comprising a combination of broadband full spectrum blue light emitting devices and one or more narrowband/broadband red light emitting devices.

Abbreviations

BBL—Black Body Locus
Blue Chl-a LED—Blue light emitting device—peak emission wavelength matching chlorophyll-a (Chl-a) blue absorption peak
Blue Chl-b LED—Blue light emitting device—peak emission wavelength matching the chlorophyll-b (Chl-b) blue absorption peak
Caro—Carotenoid
CASN—Calcium Aluminum Silicon Nitride
Chl-a—Chlorophyll-a
Chl-b—chlorophyll-b
COB—Chip On Board
FWHM—Full Width at Half Maximum
LED—Light Emitting Diode
MQW—Multiple-Quantum-Well
PAR—Photosynthetically Active Radiation
PAS—Photosynthesis Action Spectrum
PC Red LED—Phosphor Converted Red LED
PF—Photon Flux
$PF_{x-y}$—Photon flux for wavelengths from x-y nm
PFD—Photon Flux Density
PPE—Photosynthetic Photon Efficacy (Kp)
PPF—Photosynthetic Photon Flux
$PPF_{x-y}$—Photosynthetic Photon Flux for wavelengths from x-y nm
Red Chl LED—Red light emitting device—peak emission wavelength substantially matching the chlorophyll red absorption peaks
SPD—Spectral Power Distribution
YAG—Yttrium Aluminum Garnet

REFERENCE NUMERALS

10a Chlorophyll-a (Chl-a) blue absorption peak
10b Chlorophyll-a (Chl-a) red absorption peak
20a Chlorophyll-b (Chl-b) blue absorption peak
20b Chlorophyll-b (Chl-b) red absorption peak
30a, 30b Carotenoid (Caro) blue absorption peaks
40 Photosynthesis Action Spectrum (PAS) blue peak
50 Photosynthesis Action Spectrum (PAS) red peak
100 Light emitting device
110 Package
112 Package base
114 Package side wall
116 Cavity
118 LED chip
120 Bond wire
122 Contact pad
124 Light transmissive material
200 Grow-light
210 Substrate
220 Light emitting device
220a Blue Chl-a LED
220b Blue Chl-b LED
220r Red Chl LED
240 Blue emission peak

What is claimed is:

1. A grow-light comprising:
a broadband blue solid-state light source that generates broadband blue light with a peak emission wavelength from 420 nm to 495 nm;
wherein the broadband blue solid-state light source comprises a broadband InGaN/GaN multiple quantum wells LED chip comprising multiple different wavelength quantum wells in its active region that generate multiple narrowband blue to cyan light emissions of multiple different wavelengths;
wherein the broadband blue light is composed of a combination of the multiple narrowband blue to cyan light emissions; and wherein the broadband blue light has a greater full width at half maximum as compared to the narrowband blue to cyan light emissions.

2. The grow-light of claim 1, wherein the broadband blue light substantially matches at least one of:
the absorption peak wavelength of chlorophyll-a;
the absorption peak wavelength of chlorophyll-b; and
the absorption peak wavelength of carotenoid.

3. The grow-light of claim 1, wherein the peak emission wavelength of the broadband blue light is at least one of:
   from 420 nm to 450 nm;
   from 460 nm to 480 nm; and
   from 450 nm to 465 nm and 480 nm to 495 nm.

4. The grow-light of claim 1, further comprising a red solid-state light source or red photoluminescence material that generates red light with a peak emission wavelength from 630 nm to 680 nm.

5. The grow-light of claim 4, wherein the broadband blue light has a blue photon flux, and the red light has a red photon flux, and wherein a ratio of the blue photon flux to the red photon flux is from about 1:3 to about 3:1.

6. The grow-light of claim 4, wherein the ratio of the blue photon flux to the red photon flux is about 1:1.

7. The grow-light of claim 4, further comprising a far red solid-state light source or a far red photoluminescence material that generates far red light with a peak emission wavelength from about 630 nm to about 780 nm.

8. The grow-light of claim 1, further comprising at least one of: a green to yellow photoluminescence material that generates green to yellow light with a peak emission wavelength from about 540 nm to about 600 nm; and cyan to red photoluminescence material that generates cyan to red light with a peak emission wavelength from about 500 nm to about 680 nm.

9. The grow-light of claim 1, wherein broadband blue solid-state light source generates full spectrum blue light from 400 nm to 520 nm with a spectrum whose emission intensity varies by less than 25% over a wavelength range of at least 40 nm.

10. The grow-light of claim 9, wherein the emission intensity varies by less than 20%, less than 15%, or less than 10% over a wavelength range of at least 40 nm or less than 10% from 430 nm to 470 nm or from 450 nm to 465 nm.

11. The grow-light of claim 1, wherein the broadband blue light has a full width at half maximum of at least 30 nm or from about 30 nm to 80 nm.

12. A grow-light comprising:
   a broadband blue solid-state light source that generates broadband blue light with a blue photon flux; and
   a red solid-state light source that generates red light with a red photon flux;
   wherein a ratio of the blue photon flux to red photon flux is from about 1:3 to about 3:1;
   wherein the broadband blue solid-state light source comprises a broadband InGaN/GaN multiple quantum wells LED chip comprising multiple different wavelength quantum wells in its active region that generate multiple narrowband blue to cyan light emissions of multiple different wavelengths;
   wherein the broadband blue light is composed of a combination of the multiple narrowband blue to cyan light emissions; and wherein the broadband blue light has a greater full width at half maximum as compared to the narrowband blue to cyan light emissions.

13. The grow-light of claim 12, wherein the ratio of the blue photon flux to the red photon flux is about 1:1.

14. The grow-light of claim 12, wherein the broadband blue solid-state light source generates broadband blue light with a peak emission wavelength from 420 nm to 495 nm.

15. The grow-light of claim 14, wherein the broadband blue light substantially matches at least one of:
   the absorption peak wavelength of chlorophyll-a;
   the absorption peak wavelength of chlorophyll-b; and
   the absorption peak wavelength of carotenoid.

16. The grow-light of claim 15, wherein the peak emission wavelength of the broadband blue light is at least one of:
   from 420 nm to 460 nm;
   from 460 nm to 480 nm; and
   from 450 nm to 465 nm and 480 nm to 495 nm.

17. The grow-light of claim 12, wherein the broadband blue solid state light source generates a first broadband blue light from 420 nm to 450 nm with a first blue photon flux, and a second broadband blue light from 460 nm to 470 nm with a second blue photon flux, and wherein a ratio of the first blue photon flux to the second blue photon flux is from 2:1 to 4:1.

18. The grow-light of claim 12, wherein the red solid-state light source comprises a narrowband blue LED and a red photoluminescence material.

19. The grow-light of claim 12, further comprising a far red solid-state light source or a far red photoluminescence material that generates far red light with a peak emission wavelength from about 680 nm to about 780 nm.

20. The grow-light of claim 12, wherein the broadband blue light has a full width at half maximum of at least 30 nm or from about 30 nm to 80 nm.

* * * * *